(12) United States Patent
Hong

(10) Patent No.: US 11,934,396 B2
(45) Date of Patent: *Mar. 19, 2024

(54) DATA RECONCILIATION FOR BIG DATA ENVIRONMENTS

(71) Applicant: Bank of America Corporation, Charlotte, NC (US)

(72) Inventor: Yifei Hong, Livingston, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,266

(22) Filed: Apr. 17, 2023

(65) Prior Publication Data

US 2023/0252026 A1  Aug. 10, 2023

Related U.S. Application Data

(63) Continuation of application No. 17/552,439, filed on Dec. 16, 2021, now Pat. No. 11,657,050.

(51) Int. Cl.
*G06F 16/2457* (2019.01)
*G06F 16/242* (2019.01)
*G06F 16/2453* (2019.01)

(52) U.S. Cl.
CPC .... *G06F 16/24537* (2019.01); *G06F 16/2425* (2019.01)

(58) Field of Classification Search
CPC .................................................. G06F 16/24537
See application file for complete search history.

(56) References Cited

U.S. PATENT DOCUMENTS

2017/0097968 A1* 4/2017 Colodny .............. G06Q 10/087

* cited by examiner

*Primary Examiner* — Baoquoc N To
(74) *Attorney, Agent, or Firm* — Weiss & Arons LLP

(57) ABSTRACT

Apparatus and methods for reconciling data in a big data environment is provided. Methods may receive a first data set and a second data set for reconciliation. Methods may identify a first set of metadata associated with the first data set. Methods may identify a second set of metadata associated with the second data set. Methods may include a data reconciliation algorithm. The algorithm may compare the first set of metadata to the second set of metadata to obtain a subset of data found within the first data set and a subset of data found within the second data set that are joinable. Methods may dynamically construct one or more SQL queries to identify any discrepancies between the first data set and the second data set. Methods may execute the one or more SQL queries that identify any discrepancies between the first data set and the second data set.

20 Claims, 25 Drawing Sheets

```
1973
1974    select top 30 *
1975    from CLMSReporting.dbo.vwOverLayMainData
1976
1977    select *
1978    from CLMSUserSpace.OMR.CSTMRunSetting
1979    --where portfolio_id like '%202003%'
1980    where fcst_cycle=202110
1981
1982
1983    update CLMSUserSpace.OMR.CSTMRunSetting
1984    set portfolio_id = '202003_BT_CCBR_BackBook_P5_ME'
1985    where job_id = 1231
1986
1987
1988    select *
1989    from CLMSUserSpace.OMR.CSTMRunSetting a
1990    join #tmp b on a.job_id = b.job_id
1991
1992
1993    select *
1994    from #tmp
1995
1996
1997    update #tmp
1998    set output_month = 100
1999    where job_id in (550,1208)
```

FIG. 2

```
1974   select top 30 *
1975   from CLMSReporting.dbo.vwOverLayMainData
1976
1977   select *
1978   from CLMSUserSpace.OMR.CSTMRunSetting
1979   --where portfolio_id like '%202003%'
1980   where fcst_cycle=202110
1981
1982   update CLMSUserSpace.OMR.CSTMRunSetting
1983   set portfolio_id = '202003_BT_CCBR_BackBook_P5_ME'
1984   where job_id = 1231
1985
1986   select *(common set of columns from a)
1987   from CLMSUserSpace.OMR.CSTMRunSetting a
1988   join #tmp b on a.job_id = b.job_id
1989   where a.output_month <> b.output_month or a.scenario_cycle <> or b.scenario_cycle or a.sandbox <> b.sandbox
1990   order by a common set of columns
1991
1992   def tieout_dfs(data1, data2, spark=None, dims=None, metrics_exlude=['insert_ts'], metrics_substr_exlude=['balancetotalme'],
1993   numeric_threshold=0.01, intersection_only=True, fields_mapping=None, verbose=False, show_stats=False)
```

Results

| job_id | test_cycle | portfolio_id | scenario_cycle | data_set | job_name | output_mo | sandbox | scenario | output_type |
|---|---|---|---|---|---|---|---|---|---|
| 11550 | 202004 | 201406_Backtesting_BackBook_P5_ME | 202004 | newecon | 202004 BACBL 201406_Backtesting_BackBook_P5_ME72 | 2,107,592.4 | BACBL | ToState.Measures.out.CECL.out |
| 21200 | 202110 | 201512_Backtesting_BackBook_Liquidated_P5_ME202110 | 202110 | newecon | 202110 BACBL 201512_Backtesting_BackBook_Liquid72 | 2,112.6153 | BACBL | ToState.Measures.out.CECL.out |

FIG. 3

```
1974  select top 30 *
1975  from CLMSReporting.dbo.vwOverLayMainData
1976
1977  select *
1978  from CLMSUserSpace.OMR.CSTMRunSetting
1979  --where portfolio_id like '%202003%'
1980  where fcst_cycle=202110
1981
1982  update CLMSUserSpace.OMR.CSTMRunSetting
1983  set portfolio_id = '202003_BT_CCBR_BackBook_P5_ME'
1984  where job_id = 1231
1985
1986  select (common set of columns from a, dims)
1987  select a.job_id
1988  from CLMSUserSpace.OMR.CSTMRunSetting a
1989  join #tmp b on a.job_id = b.job_id
1990  where a.output_month <> b.output_month or a.scenario_cycle <> b.scenario_cycle or a.sandbox <> b.sandbox
1991  order by a.job_id
1992
1993  def tieout_dfs(data1, data2, spark=None, dims=None, metrics_exlude=['insert_ts'], metrics_substr_exlude=['balancetotalme']
1994  , numeric_threshold=0.01, intersection_only=True, fields_mapping=None, verbose=False, show_stats=False)
1995
1996
1997
1998
```

| Results | job_id |
|---|---|
| 1 | 550 |
| 2 | 1208 |

FIG. 4

```
1974  select top 30 *
1975  from CLMSReporting.dbo.vwOverLayMainData
1976
1977  select *
1978  from CLMSUserSpace.OMR.CSTMRunSetting
1979  --where portfolio_id like '%202003%'
1980  where fcst_cycle=202110
1981  update CLMSUserSpace.OMR.CSTMRunSetting
1982  set portfolio_id = '202003_BT_CCBR_BackBook_P5_ME'
1983  where job_id = 1231
1984
1985  select a.job_id, a.output_month, a.scenario_cycle
1986  from CLMSUserSpace.OMR.CSTMRunSetting a
1987  join #tmp b on a.job_id = b.job_id
1988  where a.output_month <> b.output_month or a.scenario_cycle <> b.scenario_cycle or a.sandbox <> b.sandbox
1989  order by a.job_id, a.output_month, a. scenario_cycle
1990
1991  select b.job_id, b.output_month, b.scenario_cycle
1992  from CLMSUserSpace.OMR.CSTMRunSetting a
1993  join #tmp b on a.job_id = b.job_id
1994  where a.output_month <> b.output_month or a.scenario_cycle <> b.scenario_cycle or a.sandbox <> b.sandbox
1995  order by b.job_id, b.output_month, b.scenario_cycle
1996
1997
```

Results:

| | job_id | output_month | scenario_cycle |
|---|---|---|---|
| 1 | 550 | 72 | 202004 |
| 2 | 1208 | 72 | 202110 |

| | job_id | output_month | scenario_cycle |
|---|---|---|---|
| 1 | 550 | 100 | 202004 |
| 2 | 1208 | 100 | 202110 |

FIG. 5

|   | A | B | C | D | E | F | G | H | I | J | K | L | M | N |
|---|---|---|---|---|---|---|---|---|---|---|---|---|---|---|
| 1 | job_id | output_month | scenario_cycle | sandbox | | | | | | | | | | |
| 2 | 550 | 72 | 202004 | 2.107.5902.4 | | | | | | | | | | |
| 3 | 1208 | 72 | 202110 | 2.112.6133 | | | | | | | | | | |
| 4 | | | 702 | | | | | | | | | | | |
| 5 | | | | | | | | | | | | | | |
| 6 | | | | | | | | | | rec_1 | rec_2 | | rec_1 | rec_2 |
| 7 | job_id | output_month | scenario_cycle | sandbox | | | | job_id | 550 | 1208 | | job_id | 550 | 1208 |
| 8 | 550 | 100 | 202004 | 2.107.5902.4 | | | | output_month | 72 | 72 | | output_month | 100 | 100 |
| 9 | 1208 | 100 | 202110 | 2.112.6133 | | | | scenario_cycle | 202004 | 202110 | | scenario_cycle | 202004 | 202110 |
| 10 | | | 704 | | | | | sandbox | 2.107.5902.4 | 2.112.6133 | 706 | sandbox | 2.107.59 | 2.112.6133 |
| 11 | | | | | | | | | | | | | 708 | |
| 12 | | | | | | | | | | | | | | |

| | A | B | C | D | E | F | G | H | I | J | K | L | M | N |
|---|---|---|---|---|---|---|---|---|---|---|---|---|---|---|
| 1 | job_id | output_month | scenario_cycle | sandbox | | | | | | | | | | |
| 2 | 550 | 72 | 202004 | 2.107.5902.4 | | | | | | | | | | |
| 3 | 1208 | 72 | 202110 | 2.112.6133 | | | | | | | | | | |
| 4 | | | 802 | | | | | | | | | | | |
| 5 | | | | | | | | | | rec_1 | rec_2 | | | rec_1 | rec_2 |
| 6 | | | | | | | | job_id | 550 | 1208 | | job_id | 550 | 1208 |
| 7 | job_id | output_month | scenario_cycle | sandbox | | | | output_month | 72 | 72 | | output_month | 100 | 100 |
| 8 | 550 | 100 | 202004 | 2.107.5902.4 | | | | scenario_cycle | 202004 | 202110 | | scenario_cycle | 202004 | 202110 |
| 9 | 1208 | 100 | 202110 | 2.112.6133 | | | | sandbox | 2.107.5902.4 | 2.112.6133 | | sandbox | 2.107.5902.4 | 2.112.6133 |
| 10 | | | 804 | | | | | | | 806 | | | 808 | |
| 11 | | | | | | | | | | | | | | 810 |
| 12 | | | | | | | | | rec_1_1 | rec_2_1 | rec_1_2 | rec_2_2 | | |
| 13 | | | | | | | | job_id | 550 | 1208 | 550 | 1208 | | |
| 14 | | | | | | | | output_month | 72 | 72 | 100 | 100 | | |
| 15 | | | | | | | | scenario_cycle | 202004 | 202110 | 202004 | 202110 | | |
| 16 | | | | | | | | sandbox | 2.107.5902.4 | 2.112.6133 | 2.107.5902.4 | 2.112.6133 | | |

FIG. 8

Key Function in tie_out_until —902

```
def tie_out_dfs (data1, data2, spark=None, dims=None, metrics_exclude=['insert_ts'], metrics_substr_exlude=['balancetotalme'],
numeric_threshold=0.01, intersection_only=True, fields_mapping=None, verbose=False, show_stats=False):            904

```
906 — Tie out two spark/pandas dataframes to identify any differences 908
```
param data1                  : spark/pandas dataframe one to tie out
param data2                  : spark/pandas dataframe two to tie out
param spark                  : spark instance, pandas dataframe if None
param dims                   : optional, list of fields to join two dataframes
param metrics_exclude        : optional, list of metric fields to exclude from reconciliation
param metrics_substr_exclude : optional list of substrings to pattern match metric fields to exclude from reconciliation
param numeric_threshold      : optional, numeric threshold of difference, default to 0.01
param intersection_only      : optional, if only comparing the common dataset, default to True
param fields_mapping         : optional, dictionary of mapping pairs of field names in data1 and data2
param verbose                : optional, verbose mode or note, default to False
param show_stats             : optional, generate variance statistics and/or breakdown, default to False return                       : list of 3 pandas dataframes, [diff_samples, diff_stats, diff_breakdown]
```

Sample Usage:
910 — `data1 = spark.sql ('select * from wra_gcp_cns_output.cstm2_portfolio_output_all where job_id = 281475')`
912 — `data2 = spark.sql ('select * from md1_cstm_1.all_out where job_id=1003')`
`diff = tieout_dfs (data1, data2, spark, dims = ['accountid', 'actdate'], metrics_exclude = ['insert_ts', 'portfolio_id', 'portfolio_desc', 'job_id'], fields_mapping = {'misc_fees': 'miscfee', 'billedannualfee': 'annualfee', 'billedlatefee': 'latefee'})`

914 — `data1 = pd.read_csv ('/project/usrwrk/md1/gra/app/model_runner/model_runner/cstm/assumptions/201901_bacb1.csv')`
`data2 = pd.read_csv ('/project/usrwrk/md1/gra/app/model_runner/model_runner/cstm/assumptions/201901_bacb1_v3.csv')`
`diff = tieout_dfs (data1,data2)`
...

FIG. 9

Use Case 1: Reconciling Data between Different Systems ⟵ 1002

RECONCILING FINANCE RATES DATA BETWEEN VERTICA AND HIVE

```
import sys, os
sys.path.append('/project/usrwrk/md1/gra/app/model_runner/shared')
from spark_util import read_jdbc
from tieout_util import tieout_dfs, get_tieout_dims, convert_ts_fields_2_str
```
⟵ 1004

```
data1 = read_jdbc(spark, "select * from card.fb_mob_ppnr_rates where cycle = '2021Q1'", server = 'vertica')
data2 = spark.sql('select * from md1_cstm_1.cpm_cstm_fb_mob_ppnr_rates')
```
⟵ 1006

```
diff = tieout_dfs(data1, data2, spark)
```
⟵ 1008

[Stage 14:>                                                           (0 + 1) / 1]
2021-07-19 06:52:19,966 Record counts match 507,600 vs 507,600.
2021-07-19 06:52:19,969 Schema difference: There are columns ['insert_ts'] in data2, not in data1.
[Stage 22:=================================================>   (150 + 35) / 200] ⟵ 1010
2021-07-19 06:52:32.409 Record join count matches record count 507,600.
2021-07-19 06:52:32.410 Tie out: All joined records are reconciled with differences within 0.01 in metric fields and exact match in non-metric fields.

FIG. 10A data1.dtypes ⎯1012

```
[('cycle', 'string'),
 ('vmx', 'bigint'),
 ('mob', 'bigint'),
 ('fb_bt_check_cash_fee_rate', 'decimal(16,6)'),
 ('fb_cash_adv_cash_fee_rate', 'decimal(16,6)'),
 ('fb_annual_fee', 'decimal(16,6)'),
 ('fb_interchange_rate', 'decimal(16,6)'),
 ('fb_total_comp_rate', 'decimal(16,6)'),
 ('fb_bonus_comp_exp', 'decimal(16,6)'),
 ('fb_total_points_exp_rate', 'decimal(16,6)'),
 ('fb_bonus_points_exp', 'decimal(16,6)'),
 ('bt_contract_rate', 'decimal(16,6)'),
 ('bt_promo_rate', 'decimal(16,6)'),
 ('ca_contract_rate', 'decimal(16,6)'),
 ('retail_contract_rate', 'decimal(16,6)'),
 ('retail_promo_rate', 'decimal(16,6)'),
 ('ac_contract_rate', 'decimal(16,6)'),
 ('ac_promo_rate', 'decimal(16,6)'),
 ('promo_duration', 'bigint')]
``` data2.dtypes ⎯1014

```
[('vmx', 'bigint'),
 ('mob', 'bigint'),
 ('fb_bt_check_cash_fee_rate', 'decimal(16,6)'),
 ('fb_cash_adv_cash_fee_rate', 'decimal(16,6)'),
 ('fb_annual_fee', 'decimal(16,6)'),
 ('fb_interchange_rate', 'decimal(16,6)'),
 ('fb_total_comp_rate', 'decimal(16,16)'),
 ('fb_bonus_comp_exp', 'decimal(16,6)'),
 ('fb_total_points_exp_rate', 'decimal(16,6)'),
 ('fb_bonus_points_exp', 'decimal(16,6)'),
 ('bt_contract_rate', 'decimal(16,6)'),
 ('bt_promo_rate', 'decimal(16,6)'),
 ('ca_contract_rate', 'decimal(16,6)'),
 ('retail_contract_rate', 'decimal(16,6)'),
 ('retail_promo_rate', 'decimal(16,6)'),
 ('ac_contract_rate', 'decimal(16,6)'),
 ('ac_promo_rate', 'decimal(16,6)'),
 ('promo_duration', 'bigint'),
 ('insert_ts', 'string'),
 ('cycle', 'string')]
``` get_tieout_dims(data1, data2, spark) ⎯1016

```
['cycle', 'vmx', 'mob', 'promo_duration']
```

FIG. 10B

Use Case 1: Reconciling Data between Different Systems (CONT'D)

RECONCILING FINANCE RATES DATA BETWEEN TERADATA AND HIVE — 1018

```
data1 = read_jdbc(spark, "select * from vpilot_gra01.cstmv3_in1_fb_real where per_key = 202012", server = teradata")
data2 = spark.sql('select * from md1_cstm_1.cstm_accounts where portfolio_id = 202012_FrontBook_Real"')

diff = tieout_dfs(data1, data2, spark, dims=['accountid'])
```

[Stage 26:>                                                          (0+1)/2]
2021-07-19 07:06:50,401 Record counts match 177,699 vs 177,699.
2021-07-19 07:06:50,495 Schema difference: There are columns ['insert_ts', 'portfolio_id'] in data2, not in data1.
2021-07-19 07:06:50,496 Schema difference: Columns with mismatched dtypes excluded from comparison.
2021-07-19 07:06:50,497 Column last_scsh_dt             data type as (date)     in data1 vs. (string) in data2
2021-07-19 07:06:50,498 Column open_dt                  data type as (date)     in data1 vs. (string) in data2
2021-07-19 07:06:50,498 Column renegenrollmentdt        data type as (date)     in data1 vs. (string) in data2
2021-07-19 07:06:50,498 Columnlast_sp1_mntrn_dt         data type as (date)     in data1 vs. (string) in data2
2021-07-19 07:06:50,499 Column liqddate                 data type as (date)     in data1 vs. (string) in data2
2021-07-19 07:06:50,499 Column last_sp2_mntrn_dt        data type as (date)     in data1 vs. (string) in data2
2021-07-19 07:06:50,500 Column defer_start_date         data type as (date)     in data1 vs. (string) in data2
2021-07-19 07:06:50,500 Column prim_birth_dt            data type as (date)     in data1 vs. (string) in data2
2021-07-19 07:06:50,500 Column last_csh_dt              data type as (date)     in data1 vs. (string) in data2
2021-07-19 07:06:50,501 Column defer_end_date           data type as (date)     in data1 vs. (string) in data2
2021-07-19 07:06:50,501 Column last_sp3_nmtrn_dt        data type as (date)     in data1 vs. (string) in data2
2021-07-19 07:06:50,502 Column snapdate                 data type as (date)     in data1 vs. (string) in data2
2021-07-19 07:06:50,502 Column last_rtl_dt              data type as (date)     in data1 vs. (string) in data2

FIG. 10C

Use Case 1: Reconciling Data between Different Systems (CONT'D)

```
[Stage 34:>                                                      (0+1)/1]
2021-07-19 07:08:10,301 Record join count matches record count 177,669.
2021-07-19 07:08:10,301 Tie out: All joined records are reconciled with differences within 0.01 in metric fields and exact match
in non metric fields.
```
— 1026

```
data1 = read_jdbc(spark, "select * from vpilot_gra01.cstmv3_in1_fb_real where per_key = 202012", server = teradata')
data1 = convert_ts_fields_2_str(spark, data1)
data2 = spark.sql('select * from md1_cstm_1.cstm_accounts where portfolio_id = 202012_FrontBook_Real''')
```
— 1028

```
diff = tieout_dfs(data1, data2, spark, dims=[accountid'])
```
— 1030

```
[Stage 37:========================================>            (9+1)/10]
2021-07-19 07:10:06,781 Record counts match 177,669 vs 177,669.
2021-07-19 07:10:06,871 Schema difference: There are columns ['insert_ts', 'portfolio_id'] in data2, not in data1.
```

```
[Stage 45:>                                                      (0+1)/1]
2021-07-19 07:10:58,109 Record join count matches record count 177,669.
2021-07-19 07:10:58,110 Tie out: All joined records are reconciled with differences within 0.01 in metric fields and exact match
in non metric fields.
```
— 1032

FIG. 10D

Use Case 2: Results Tieout and Impact Analysis in Model Developement

RECONCILING CSTM V3 201812 BACKBOOK MODEL RESULTS ⸺1102

```
data1 = spark.sql('select * from md1_cstm_1.cstm_submodel_out where job_id == 431')
data1 = spark.read.load('hdfs://nameservice1/usrwrk/m04/gra/data/cstmrunner/zkwzndg/tieout/app-20210622180033-0529-aedf6926-
266-462b-87fb-b45c08c9a9793-400k-Submodel.parquet')
data2 = convert_ts_fields-2-str(spark,data2)

diff = tieout_dfs(data1, data2, spark, dims=[accountid', 'octdate'], metrics_exclude = ['insert_ts', 'job_id', 'portfolio_id'], show_stats =
True)
```

[Stage 378:==================================> (781+5) / 786]
2021-07-12 23:35:59,795 Record counts match 23,547,900 vs 23,547,900.
[Stage 386:==================================> (199+1) / 200]
2021-07-12 23:36:55,950 Record join count matches record count 23,547,900.
2021-07-12 23:36:55,951 No Tie: There are 22,205,335 records (94.3%) with differences over 0.01 in metric fields or mismatch in non-metric fields
[Stage 432:==================================> (183+17) / 200]
2021-07-12 23:40:34,153 Differences exist in 16 out of 22 fields ['u_d65_mp', 'b_d35_mp', 'u_d35_mp', 'b_d65_mp', 'u_d5_mp', 'u_sm_mn', 'u_mn_mp', 'b_sm_mp', 'u_sm_mp', 'b_mn_mp', 'pmt_o_s', 'pmt_f_s', 'pmt_m_s', 'pmt_s_s']
2021-07-12 23:40:34,154
2021-07-12 23:40:34, 155 Statistics of differences in 16 numeric fields (23, 547,900 joined records)...

FIG. 11A

| [Stage 482: ══════════════════════════> (1397+3)/1400][0][6][6] | | | | | | | | |
|---|---|---|---|---|---|---|---|---|
| numeric_field | max_diff | min_diff | mean_diff | stddev.diff | cnt_diff | pct_diff | mean_data1 | mean_data2 | pct_var |
| u_d65_mp | 0.069963 | -0.092018 | -0.015068 | 0.025594 | 15727178 | 0.6678802781 | 0.759656 | 0.774724 | -0.019449 |
| b_d65_mp | 0.135209 | -0.112333 | -0.015879 | 0.035095 | 15683628 | 0.6660308563 | 0.817343 | 0.833221 | -0.019057 |
| u_d35_mp | 0.079903 | -0.120372 | 0.007602 | 0.029749 | 15616520 | 0.6631810055 | 0.417593 | 0.409991 | -0.018541 |
| b_d35_mp | 0.130203 | -0.117531 | 0.024454 | 0.043246 | 10845712 | 0.4605808586 | 0.550366 | 0.525912 | -0.046498 | 1116 |
| u_d5_mp | 0.064605 | -0.139222 | -0.010006 | 0.029392 | 10175872 | 0.4321350099 | 0.113209 | 0.123214 | -0.081206 |
| b_d5_mp | 0.073758 | -0.042994 | 0.000553 | 0.011609 | 8576798 | 0.364277231 | 0.104698 | 0.104145 | -0.005309 |
| u_sm_mp | 0.053803 | -0.061966 | -0.000927 | 0.006943 | 2082070 | 0.884185002 | 0.065289 | 0.066216 | -0.014004 |
| b_sm_mp | 0.098456 | -0.022701 | 0.000397 | 0.004997 | 1567379 | 0.0666613070 | 0.061815 | 0.061418 | -0.006458 |
| u_mn_mp | 0.074308 | -0.085638 | -0.001570 | 0.007476 | 1299484 | 0.0551874086 | 0.036711 | 0.038281 | -0.041025 | 1118 |
| b_mn_mp | 0.048926 | -0.058648 | -0.000968 | 0.005698 | 1147949 | 0.0487495276 | 0.055944 | 0.056912 | -0.017013 |
| u_sm_mn | 0.103055 | -0.026851 | -0.000460 | 0.004779 | 1021222 | 0.0436785587 | 0.062668 | 0.063128 | -0.007292 |
| b_sm_mn | 0.063509 | -0.024027 | -0.000219 | 0.003288 | 415201 | 0.0176321880 | 0.039141 | 0.039356 | -0.005552 |
| u_mn_mp | 0.049251 | -0.237057 | -0.000005 | 0.001938 | 79313 | 0.0033681560 | 0.041591 | 0.041596 | -0.000124 |
| pmt_o_s | 0.051554 | -0.367238 | -0.000048 | 0.001268 | 9358 | 0.00003974027 | 0.086942 | 0.086990 | -0.000556 |
| pmt_f_s | 0.025814 | -0.143446 | -0.000021 | 0.000266 | 473 | 0.0000200867 | 0.031343 | 0.031364 | -0.000559 |
| pmt_s_s | 0.029936 | -0.077576 | -0.000019 | 0.000225 | 276 | 0.0000117208 | 0.003191 | 0.003210 | -0.005877 |

Use Case 2: Results Tieout and Impact Analysis in Model Developement (Cont'd)

RECONCILING CSTM V3 201812 BACKBOOK PORTFOLIO DATA — 1119

─────────────────────────────────────────────────────── 1120
data1 = spark.read.load('hdfs://nameservice1/usrwrk/m04/gra/data/cstmrunner/400kaccounts_in1data_actual_parquet')
data2 = spark.sql("select * from md1_cstm_1.cstm_accounts where portfolio_id = '201812_BackBook'")   # 1% portfolio data from Modeling team
                                                                                                      # 100% portfolio data from Data team
diff = tieout_dfs(data1, data2, spark, dims=['accountid'], fields_mapping={'prod_acct_no_tu_ccba': 'accountid'}, show_stats=True)

[Stage 42:                                                                        (0+1) / 1]         — 1122
2021-07-12 23:04:54,126 Record counts do not match 392,465 vs 40,111,714.

2021-07-12 23:05:57,447 Record join count matches record count 392,465.
2021-07-12 23:05:57,440 No Tie: There are 392,465 records (100%) with differences over 0.01 in metric fields or mismatch in non-metric fields.

[Stage 76:===============================================================>        (199+1) / 200]    — 1124
2021-07-12 23:12:00,926 Differences exist in 29 out of 304 fields ['ce9_principal', 'ctd_fee', 'annualfeemonth', 'until', 'finchg2stmt_last_3m', 'r', 'everd30date', 'over_min_pay_am', 'co_gross_bal_am', 'stmt_count_6mo', 'over2xminpay_count', 'rev_ct', 'everd60pdate', 'min_pay_count', 'annue', 'port_seg_flag', 'liqddate', 'ce3_variablestdapr', 'ce4_variablestdapr', 'prim_birth_dt', 'ce1_variablesdapr', 'defer_start_date', 'deferrar']
2021-07-12 23:12:00,927
2021-07-12 23:12:00,927 Statistics of differences in 19 numeric fields (392,465 joined records)...

FIG. 11C

| [Stage 117:======================> (199+1)/200]]]]]] | | | | | | | | 1126 |
|---|---|---|---|---|---|---|---|---|
| numeric_field | max_diff | min_diff | mean_diff | stddev.diff | cnt_diff | pct_diff | mean_data1 | mean_data2 | pct_var |
| ctd_fee | 6.910000e+02 | -4000.000000 | -2.419330 | 26.295982 | 22558 | 0.05747774 | 1.621786 | 4.04112 | -5.986786e-01 |
| annualfeemonth | 1.200000e+01 | 0.000000 | 0.192170 | 1.239550 | 11526 | 0.02936822 | 6.537095 | 6.53568 | 2.161470e-04 |
| ce9_principal | 0.000000e+00 | -15132.660000 | -0.277502 | 120.113254 | 10881 | 0.02772477 | -5.277502 | 0 | 1.000000e+00 |
| util | 1.009567e+02 | -748.586757 | -0.107923 | 3.180529 | 6312 | 0.02372696 | 28.061990 | 28.1699 | -3.831143e-03 |
| dep_inv_am | 1.850000e+00 | -2.690000 | -0.000059 | 0.012902 | 5724 | 0.01458474 | 42077.160365 | 42077.2 | -1.420944e-09 |
| finchg2stmt_last3m | 1.764710e+03 | -33989.330000 | -0.210882 | 67.119581 | 2733 | 0.00696368 | 1.335079 | 1.59755 | -1.642968e-01 |
| rcli_counter | 1.280000e+02 | -128.000000 | 0.273472 | 6.981603 | 2316 | 0.00590116 | 46.476804 | 44.5812 | 4.251937e-02 |
| co_gross_bal_am | 0.000000e+00 | -457075.370000 | -4.970583 | 266.752332 | 357 | 0.00090964 | 5178.617735 | 5185.94 | -1.412139e-03 |
| rev_ct | 9.900000e+01 | 0.000000 | 0.089058 | 2.954005 | 354 | 0.00090199 | 8.278222 | 8.19626 | 1.000004e-02 |
| everd5date | 0.000000e+00 | 200703.000000 | -167.575384 | 5794.190447 | 328 | 0.00083574 | 201483.447502 | 201480 | 1.562655e-05 |
| stmt_count_6mo | 1.000000e+00 | 0.000000 | 0.000171 | 0.013065 | 67 | 0.00017072 | 4.102740 | 4.10257 | 4.161193e-05 |
| reneg_bal | 6.083100e+03 | -1007.810000 | 0.050971 | 15.295147 | 52 | 0.00013250 | 7376.973796 | 7365.82 | 1.514438e-03 |
| over_min_pay_am | 7.105427e-15 | -2161.440000 | -0.043166 | 6.344619 | 52 | 0.00013250 | 546.439525 | 542.271 | 7.687343e-03 |
| everd30date | 0.000000e+00 | -200806.000000 | -19.925818 | 1998.772192 | 39 | 0.00009937 | 201488.711705 | 201487 | 1.042491e-05 |
| over3xminpay_count | 1.000000e+00 | 0.000000 | 0.000087 | 0.009307 | 34 | 0.00008633 | 2.383461 | 2.38337 | 3.634844e-05 |
| annualfeeamount | 7.600000e-01 | 0.000000 | 0.000013 | 0.002515 | 20 | 0.00005093 | 7.322503 | 7.32249 | 1.747551e-06 |
| everd60pdate | 0.000000e+00 | -200510.000000 | -6.130789 | 1108.715470 | 12 | 0.00003058 | 201644.173378 | 201642 | 1.184354e-05 |
| minpay_count | 1.000000e+00 | 0.000000 | 0.000015 | 0.003910 | 6 | 0.00001529 | 0.363375 | 0.36336 | 4.207397e-05 |
| payment_rate | 1.000000e+00 | -0.00050 | 0.000951 | 0.298572 | 5 | 0.00001274 | 873.640892 | 873.65553325 | -1.675807e-05 |

FIG. 11D 2021-07-12 23:14:04,155 Breakdown of differences (top 3 categories) in 10 non-numeric fields (392,465 joined records)... ⎯1128

[Stage 168:==================================> (199+1) / 200]]]]

| non_numeric_field | value_data1 | value_data2 | cnt_diff | pct_diff | cnt_diff_total |
|---|---|---|---|---|---|
| liqddate | 2020-11-01 | None | 314218 | 0.800627 | 392465 |
| liqddate | 2019-08-01 | None | 5820 | 0.014829 | 392465 |
| liqddate | 2019-09-01 | None | 5691 | 0.014501 | 392465 |
| port_seg_flag | Transactor | Transactor | 77951 | 0.198619 | 370343 |
| port_seg_flag | Inactive | Inactive | 53124 | 0.135360 | 370343 |
| port_seg_flag | Retail Only-Low Risk Revolver | Retail Only-Low Risk Revolver | 50582 | 0.128883 | 370343 |
| ce1_variablestdapr | V | F | 3721 | 0.009481 | 3721 |
| ce3_variablestdapr | V | F | 3603 | 0.009180 | 3603 |
| ce4_variablestdapr | V | F | 820 | 0.002089 | 520 |
| prim_birth_dt | NaT | None | 717 | 0.001827 | 717 |
| ce2_variablestdapr | V | F | 265 | 0.000675 | 265 |
| defer_end_date | 2020-07-28 | None | 8 | 0.000020 | 247 |
| defer_end_date | None | 2020-07-28 | 7 | 0.000018 | 247 |
| defer_end_date | None | 2020-08-15 | 7 | 0.000018 | 247 |
| defer_start_date | None | 2020-04-18 | 29 | 0.000074 | 172 |
| defer_start_date | 2020-04-18 | None | 18 | 0.000046 | 172 |
| defer_start_date | None | 2020-05-05 | 13 | 0.000033 | 172 |
| deferral | 0 | 1 | 101 | 0.000257 | 171 |
| deferral | 1 | 0 | 70 | 0.000178 | 171 |

FIG. 11E

Use Case 3: Reconciling Macroeconomic Data from EVER Downloads — 1202

RECONCILING DIFFERENT VERSIONS OF MACROECONOMIC DATA FROM EVER DOWNLOAD — 1204

```
spark.sql("""select * from wra_model_input.mef_version_lookup
where version_desc = 'Web Pull' and process_type = 'mef_pre_vap' and frcst_cyc_cd = '202105' and ent_scnro_cd =
'BACBL'""").show(10,False)
```
— 1206

| frcst_cyc_cd | ent_scnro_cd | load_id | base_version | per_key | model_type | version | version_desc | insert_by | insert_ts | process_type |
|---|---|---|---|---|---|---|---|---|---|---|
| 202105 | BACBL | null | null | 202103 | null | 48762 | Web Pull | system | 2021-05-13 22:17:04.030747 | mef_pre_vap |
| 202105 | BACBL | null | null | 202103 | null | 48785 | Web Pull | system | 2021-05-18 22:31:56.190503 | mef_pre_vap |
| 202105 | BACBL | null | null | 202103 | null | 48973 | Web Pull | system | 2021-07-06 22:19:13.934323 | mef_pre_vap |

— 1208
```
data1 = spark.sql('select * from from wra_model_input.mef_pre_vap where version = 48762')
data2 = spark.sql('select * from from wra_model_input.mef_pre_vap where version = 48973')

diff = tieout_dfs(data1, data2, spark, dims=['var_periodicity_cd', 'mcro_econ_var_cd', 'mcro_econ_var_msr_dt'], metrics_exclude
= ['insert_ts', 'version'], show_stats=True)
```

— 1210
[Stage 166:
2021-07-19 09:20:45,668 No Tie: Record counts do not match 265,670 vs 611,179.
                                                    (0+1) / 1]
— 1212
[Stage 174:
2021-07-19 09:21:06,758 Record join count matches record count 265,670.
2021-07-19 09:21:06,758 Tie out: All joined records are reconciled with differences within 0.01 in metric fields and exact match
in non-metric fields.

FIG. 12A

RECONCILING MACRO DATA IN PANDAS DATAFRAME ⎯ 1214

```
data1 = pd.read_csv(r'/project/usrwrk/md1/gra/app/model_runner/tests/data/tieout/201901_bacbl_v3.csv')
data2 = pd.read_csv(r'/project/usrwrk/md1/gra/app/model_runner/tests/data/tieout/201901_bacbl.csv')

diff = tieout_dfs(data1, data2, show_stats=True)
```
⎯ 1216

⎯ 1218

2021-07-19 08:33:19,585 Record counts match 1,152 vs 1,152.
2021-07-19 08:33:19,589 Schema difference: There are columns ['st_hpi_nm', 'st_hpi_ar', 'st_hpi_nv', 'st_hpi_ut', 'st_hpi_wy', 'st_hpi_ct', 'st_hpi_va', 'st_hpi_ia', 'st_hpi_il', 'st_hpi_ky', 'st_hpi_mo', 'st_hpi_nj', 'st_hpi_pa', 'st_hpi_ms', 'st_hpi_al', 'st_hpi_ma', 'st_hpi_sc', 'st_hpi_nd', 'st_hpi_co', 'st_hpi_me', 'st_hpi_ca', 'st_hpi_la', 'st_hpi_wv', 'st_hpi_or', 'st_hpi_az', 'st_hpi_dc', 'st_hpi_sd', 'st_hpi_nh', 'st_hpi_oh', 'st_hpi_vt', 'st_hpi_nc', 'st_hpi_ak', 'st_hpi_wi', 'st_hpi_ny', 'st_hpi_tx', 'st_hpi_hi', 'st_hpi_ok', 'st_hpi_de', 'st_hpi_ga', 'st_hpi_md', 'st_hpi_tn', 'st_hpi_ri', 'st_hpi_ne', 'st_hpi_mi', 'st_hpi_mt', 'st_hpi_ks', 'st_hpi_mn', 'st_hpi_mt', 'st_hpi_in', 'st_hpi_wa', 'st_hpi_id', 'bac_hpi_mbs'] in data2, not in data1.
2021-07-19 08:33:27,849 Record join count matches record count 1,152.
2021-07-19 08:33:27,850 No Tie: There are 504 records (43.8%) with differences over 0.01 in metric fields or mismatch in non-metric fields.
2021-07-19 08:33:43,530 Differences exist in 1 out of 55 fields ['pce'].
2021-07-19 08:33:43,531
2021-07-19 08:33:43,532 Statistics of differences in 1 numeric fields (1,152 joined records)...

numeric_field   max_diff   min_diff    mean_diff       cnt_diff   pct_diff   mean_data1       mean_data2      pct_var
pce             6303.6     -0.000007   2013.935938     504        0.4375     14173.983488     12070.047551    -0.17431
```

FIG. 12B

```
def test_nmm_cecl_overlay_prod(spark, dir_root):  ─ 1302
    cycles = ['2021Q1']
    db_name, tbl_name = 'md1_cstmdev', 'nmm_cecl_overlay'
    overlay_table, overlay_agg_table = f'{db_name}.{tbl_name}', f'{db_name}.{tbl_name}_fa_agg'
    path_yaml = os.path.join(dir_root, r'overlay/nmm_overlay_input.yml')
    for cycle in cycles:
        query = yaml.safe_load(open(path_yaml))['cecl_overlay'].format(forecast_cycle=f"'{cycle}'",
            overlayid_filter = '1=1')
        inputs = exec_sql(query)
        inputs.columns = inputs.columns.str.lower()
        run_nmm_cecl_overlay(spark, inputs, cycle, db_name)
        spark.catalog.refreshTable(overlay_table)
        data1 = spark.sql(f"select * from {overlay_table}")
        data2 = spark.sql(f"select * from {overlay_table}_result where cycle = '{cycle}'")
        assert tieout_dfs(data1, data2, spark, numeric_thrshold = 1.5, intersection_only =False) is None
        spark.catalog.refreshTable(overlay_agg_table)
        data1 = spark.sql(f"select * from {overlay_agg_table}")
        data2 = spark.sql(f"select * from {overlay_agg_table}_result where cycle = '{cycle}'")
        assert tieout_dfs(data1, data2, spark, intersection_only =False) is None
```

FIG. 13A

```
def test_run_cstm_agg(spark):  ⎯1304
    job_ids = conver_ids_2_list('973-982')
    query_runs = f"select * from CLMSUserSparce.omr.SCTMRunSetting where active_flag = 1 and job_id in ({','.join(str(x) for x in job_ids)})"
    df_runs = exec_sql(query_runs)
    output_types = ['ToState.Measures.out', 'CECL.out', 'transition.out']
    run_cstm_agg(spark, df_runs, output_types, dynamic_schema=False, actual_only=False, forecast_only=False, db_name = 'md1_cstmdev')

str_job_ids = ','.join(str(job_id) for job_id in job_ids)  ⎯1306
    for output_type in output_types:
        spark.catalog.refreshTable(f'md1_cstmdev.{dict_agg[output_type]}_agg')
        data1 = spark.sql(f"select * from md1_cstmdev.{dict_agg[output_type]}_agg where abs(job_id) in ({str_job_ids})")
        data2 = spark.sql(f"select * from md1_cstm_1.{dict_agg[output_type]}_agg where abs(job_id) in ({str_job_ids})")
        assert tieout_dfs(data1, data2, spark, intersection_only=True) is None
```

FIG. 13B

```
def test_pull_portfolio(spark, jdbc_conn_teradata): ⎯1308
    # python3 cstm_data_puller.py -s 202012 -bt bb, fb, fbr -u 2>spam
    snapdate = '202012' # 22.4 mins
    pull_portfolio(spark, teradata_db, dst_db, [snapdate], jdbc_conn_teradata)
    pull_portfolio(spark, teradata_db, dst_db, [snapdate], jdbc_conn_teradata)
    data1 = spark.sql(f"select * from {dst_db}.cstm_accounts where portfolio_id' {snapdate}_FrontBook_%' and insert_ts>'{dt_now}'")
    data2 = spark.sql(f"select * from {dgt_db}.cstm_accounts where portfolio_id' {snapdate}_FrontBook_%'")
    assert data1.count()>0
    assert tieout_dfs(data1, data2, spark, dims=['portfolio_id', 'accountid'])
    None
    data1 = spark.sql(f"select * from {dst_db}.cstm_accounts where portfolio_id'")
    data2 = spark.sql(f"select * from {dgt_db}.cstm_accounts where portfolio_id'")
    assert data1.count()>0
    assert tieout_dfs(data1, data2, spark, dims=['portfolio_id', 'accountid'])

def test_run_cpm_cstm_agg(spark): ⎯1310
    job_ids = convert_ids_2_list(
    '277394,277395,277392,277391,262914,265769,262915,265773,18929,18930,19306,
    inputs = spark.sql(f'select * from md1_cstmdev.cpm_cstm_job_attribute where
    join(str(x) for x in job_ids))).toPandas()
    inputs.columns = inputs.columns.str.lower()
    run_cpm_cst_agg(spark, inputs, db_name='md1_cstmdev')

str_job_ids = ', '.join(str(job_id) for job_id in job_ids)
for runtype in ['alll', 'cec1']:
    spark.catalog.refreshTable(f'md1_cstmdev.cpm_cstm_{runtype}_agg')
    data1 = spark.sql(f"select * from md1_cstmdev.cpm_cstm_{runtype}_agg where ((str_job_ids))")
    data2 = spark.sql(f"select * from md1_cstm_1.cpm_cstm_{runtype}_agg where ((str_job_ids))")
    assert tieout_dfs(data1, data2, spark, intersection_only=False) is None
```

FIG. 13C

DATA RECONCILIATION FOR BIG DATA ENVIRONMENTS

This application is a continuation of U.S. patent application Ser. No. 17/552,439 filed on Dec. 16, 2021, now U.S. Pat. No. 11,657,050, and entitled "DATA RECONCILIATION FOR BIG DATA ENVIRONMENTS" which is hereby incorporated by reference herein in its entirety.

FIELD OF TECHNOLOGY

Aspects of the disclosure relate to big data environments.

BACKGROUND OF THE DISCLOSURE

Data reconciliation may be understood to be the process of verification of data during a data transfer. As data is transferred from one location to another location, it is important to track the data movement so that there is a clear image of the transfer. The image of the transfer may also represent the data lineage. Maintaining accurate and clear data lineage may identify each step of the data transfer and therefore ensure that there is no undesired transfer, transformation or problem in the data transition.

Data reconciliation involves mathematical algorithms. Conventional data reconciliation algorithms and associated systems have been used for systems with conventionally-sized data silos. However, as enterprises utilize more and more data, and data silos have grown to multiple petabytes, also referred to as big data, conventional data reconciliation algorithms and associated systems have become sub-optimal. Therefore, it would be desirable to create updated data reconciliation algorithms that are more advantageous and specialized for a big data environment.

SUMMARY OF THE DISCLOSURE

There exist challenges when implementing data reconciliation in a big data environment. A first challenge may involve determining, within a predetermined time period, whether there are differences or discrepancies between two large-sized data sets.

Once the determination has been made that there are differences or discrepancies between the two data sets, a second challenge may involve identifying the location, or locations, of the differences or discrepancies.

The size of the files makes it difficult to perform, in a relatively short time period, conventional data reconciliation to identify the differences or discrepancies between the files.

An illustration of the data size may be understood by the following example: A financial institution may have various departments. These departments may include a mortgage department, a home equity loan department, a checking account department, a savings account department, a certificate of deposit (CD) department and a credit card department. Each of the departments may execute various reporting algorithms and thereby produce various reporting logs each week, each month, each quarter and each year.

In one example, the credit card department may execute a credit loss forecast log for credit cards each quarter. Such a credit loss forecast log may include twenty billion records, which may account for approximately six terabytes of memory. It should be appreciated that the credit loss forecast log is one of many reporting logs included in the credit card department, and the credit card department is one of many departments included in the financial institution.

The credit loss forecast log may be transferred from a first location in memory to a second location in memory. In order to confirm the completeness of the data transfer, a comparison may be executed between the credit loss forecast log stored in the first location and the credit loss forecast log stored in the second location. Such a data reconciliation that compares approximately six terabytes of memory stored in the first location to six terabytes of memory stored in the second location may involve non-conventional data reconciliation systems and methods. Such non-conventional data reconciliation systems and methods may execute the data reconciliation within a relatively short time period, such as less than, or equal to one minute.

Apparatus and methods for reconciling data in a big data environment is provided. Methods may include receiving a first data set and a second data set for reconciliation. Methods may include identifying a first set of metadata associated with the first data set. Methods may include identifying a second set of metadata associated with the second data set.

Methods may include comparing the first set of metadata to the second set of metadata to obtain a joinable link between the two data sets. Methods may include identifying a subset of data found within the first data set and a subset of data found within the second data set. The subset of data found within the first data set and the subset of data found within the second data set may be joinable.

Methods may include dynamically constructing one or more structured query language (SQL) queries to identify any discrepancies between the first data set and the second data set. The SQL query may utilize the subset of data found within the first data set and the subset of data found within the second data set to join the first data set to the second data set. Methods may include executing the one or more SQL queries to identify any discrepancies between the first data set and the second data set. Any identified discrepancies may be displayed to a user.

It should be noted that the physical data memory location of the first data set and the physical data memory location of the second data set may be different data locations.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows another illustrative diagram in accordance with principles of the disclosure;

FIG. 3 shows yet another illustrative diagram in accordance with principles of the disclosure;

FIG. 4 shows still another illustrative diagram in accordance with principles of the disclosure;

FIG. 5 shows yet another illustrative diagram in accordance with principles of the disclosure;

FIG. 7 shows yet another illustrative diagram in accordance with principles of the disclosure;

FIG. 8 shows still another illustrative diagram in accordance with principles of the disclosure;

FIG. 9 shows yet another illustrative diagram in accordance with principles of the disclosure;

FIGS. 10A, 10B, 10C and 10D show another illustrative diagram in accordance with principles of the disclosure;

FIGS. 11A, 11B, 11C, 11D and 11E show yet another illustrative diagram in accordance with principles of the disclosure;

FIGS. 12A and 12B show still another illustrative diagram in accordance with principles of the disclosure;

FIGS. 13A, 13B and 13C show yet another illustrative diagram in accordance with principles of the disclosure;

DETAILED DESCRIPTION OF THE DISCLOSURE

Figure 1:
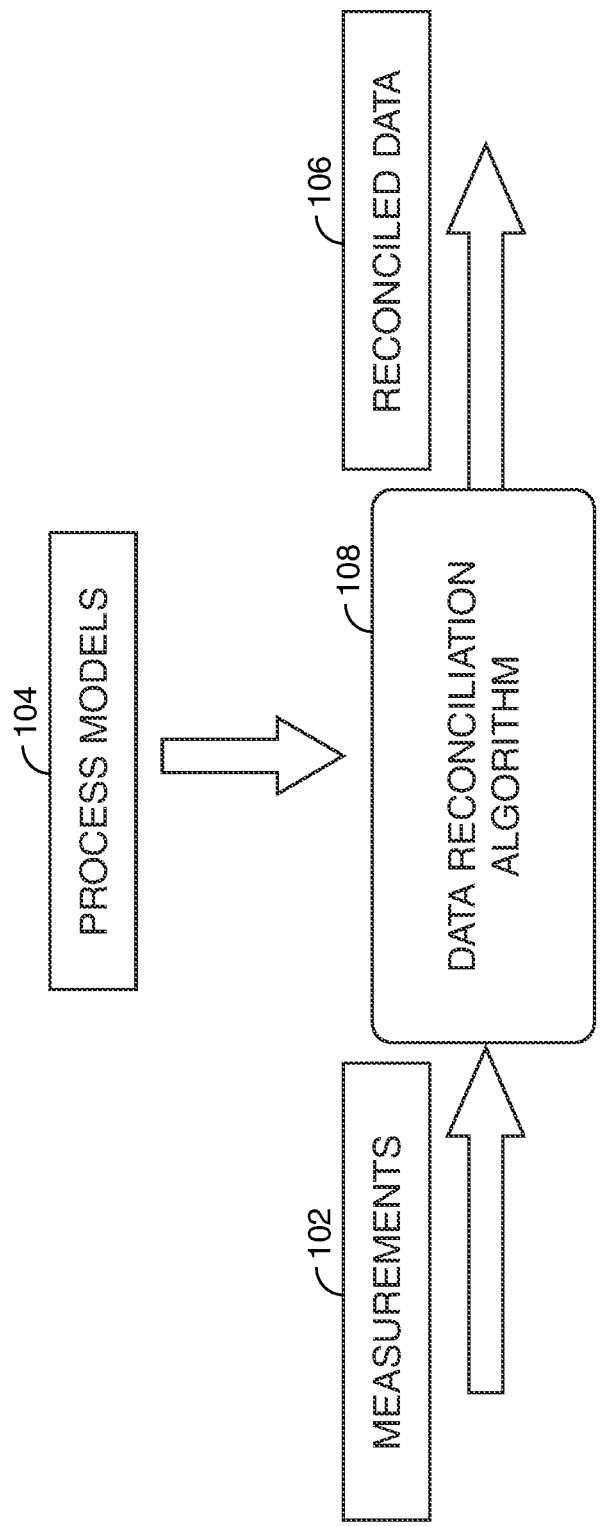
FIG. 1 shows an illustrative diagram in accordance with principles of the disclosure.

Apparatus and methods for data reconciliation in a big data environment is provided. Apparatus and methods may include and/or utilize a hardware processor, a server-based receiver, a display and any other suitable components.

Methods may include receiving identification of a first big data set and a second big data set. The size of the first big data set and the second big data set may be larger than 5 terabytes. The server-based receiver may be used to receive identification of the first big data set and the second big data set.

Methods may include receiving a dimension, also referred to as dims. The server-based receiver may be used to receive the dimension. The dimension may include a first set of fields from the first big data set and a second set of fields from the second big data set. The dimension may be used to join the first big data set to the second big data set. The dimension may also be referred to as SQL join fields.

The first set of fields may correspond to the second set of fields. The first set of fields from the first big data set may be a primary key of the first big data set. The second set of fields from the second big data set may be a primary key of the second big data set.

In some embodiments, the dimension may be system generated. As such, methods may include identifying a first set of metadata associated with the first big data set. The first set of metadata may include a set of schema information and a set of data type information. Methods may also include identifying a second set of metadata associated with the second big data set. The second set of metadata may include a second set of schema information and a second set of data type information. Methods may also include identifying a first subset of metadata from the first set of metadata and a second subset of metadata from the second set of metadata. The first subset may correspond to the second subset. Methods may include generating a dimension based on the first subset of metadata that corresponds to the second subset of metadata. The dimension may include a first set of fields from the first big data set and a second set of fields from the second big data set. The first set of fields may correspond to the second set of fields.

Methods may include dynamically constructing a SQL query to compare the first big data set to the second big data set. The constructing may use the dimension as a join set of data fields within the SQL query. The SQL query may further include a where clause. The where clause may include comparing of a set of column names in the first big data set that correspond to a second set of column names in the second big data set. As such, the where clause may determine any differences, between data records included in the first data set and data records included in the second data set, that are found within the specified column names. In the event that there are differences between two records and the differences are located in a column name that is not specified within the where clause, the SQL query may not identify those differences.

Methods may include executing the query on the first big data set and the second big data set. Methods may include generating a result set from the SQL query.

An exemplary SQL query may include selecting a first data set and a second data set, joining the first data set with the second data set based on a link between a first column from the first data set and a second column from the second data set, where a cell in a third column of the first data set is not equal to a corresponding cell in a fourth column of the second data set or a cell in a fifth column of the first data set is not equal to a corresponding cell in a sixth column of the second data set or a cell in a seventh column in the first data set is not equal to a corresponding cell in an eighth column of the second data set, ordering a set of results by the first column, then by the third column, then by the fifth column and then by the eighth column.

In some embodiments, methods may include identifying that the result set is empty. Based on the empty result set, methods may include identifying that there are no differences between the first big data set and the second big data set. Methods may also include presenting to a user that a data reconciliation between the first big data set and the second big data set obtained a no differences result.

In other embodiments, methods may include identifying that the result set includes one or more differences. The result set may include one or more columns that are included in the first big data set that correspond to one or more columns that are included in the second big data set.

Methods may include ordering the result set by the differences included in the first of the one or more columns. The differences may be included in a top portion of the first column.

Methods may include selecting a first predetermined number of rows in the ordered result set. It should be appreciated that the selected rows may be associated with the one or more columns. The first predetermined number of rows may be 200, 2000 or any other suitable number. Methods may include transposing the first predetermined number of rows where the columns become rows and the rows become columns.

Methods may include identifying a subset of the differences along a first row that corresponds to the first column. Methods may include selecting the subset of the differences from the first row.

Methods may include dynamically reconstructing the SQL query by removing a column name of the first column from the where clause included in the SQL query. Methods may include executing the reconstructed SQL query. It should be noted that the SQL query and the reconstructed SQL query may be executed in parallel.

Methods may include identifying that the result set includes a second subset of one or more differences. The result set may include one or more columns that are included in the second big data set. Methods may include ordering the result set by the second subset of the differences included in a subsequent column of the one or more columns. The second subset of the differences may be included in the top portion of the subsequent column.

Methods may include selecting a subsequent predetermined number of rows in the ordered result set. The predetermined number of rows may be 200, 2000 or any other suitable number. The selected rows may be associated with the one or more columns. It should be appreciated that the selection may limit the cells within the rows to the cells that correspond to the subsequent column. Methods may include transposing the subsequent predetermined number of rows in the ordered result set. The columns may become rows and the rows may become columns.

Methods may include identifying the second subset of the differences along a subsequent row that corresponds to the subsequent column. Methods may include selecting the second subset of the differences from the subsequent row.

Methods may include repeating the dynamic reconstruction of the SQL query by removing the subsequent column from the SQL query, executing the reconstructed query, ordering the result set, selecting the subsequent rows, transposing the rows and identifying the differences. The method may be repeated until all the differences between the first data set and the second data set have been identified.

Methods may include upon completion of identifying differences between the first big data set and the second big data set, displaying the differences identified from each of the rows. The set differences displayed may include a set of differences identified from the query, a set of differences identified from the subsequent query and any other differences identified from any other further query. The differences may be displayed on a mobile device, computer display or any other suitable display.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. Data reconciliation algorithm 108 may receive various inputs, such as process models 104 and data measurements 102. Data measurements 102 may determine the selection of the appropriate data reconciliation algorithm. Data reconciliation algorithm 108 may be used to output reconciled data 108.

FIGS. 2-8 show exemplary diagrams that illustrate the backend processes of a data reconciliation in big data environments.

FIG. 2 shows illustrative diagram 200. Illustrative diagram 200 shows exemplary SQL queries. Section 202 may correspond to line numbers in the query. Section 204 may correspond to the language of the query.

At line numbers 1974 and 1975, a SQL query may select the top thirty records from a data file named CLMSReporting.dbo.vwOverLayMainData.

At line numbers 1977, 1978 and 1980, a SQL query may select all records. Selection of all records may be indicated by the (*) indicator. The records may be selected from a data file named CLMSUserSpace.OMR.CSTMRunSetting. The data records may be selected when the variable fcst_cycle, included in the data records, is equivalent to 202110. Line number 1979 may indicate a commented-out portion of the query which states, 'where portfolio_id like '%202003%'.

At line numbers 1983, 1984 and 1985, a SQL query may update CLMSUserSpace.OMR.CSGMRunSetting by setting the portfolio id to '202003_BT_CCBR_ BackBook_ P5_ME' in records where in the job identifier field, also referred to herein as job_id field, is equivalent to 1231.

At line numbers 1988, 1989 and 1990, a SQL query may select all records from CLMSUserSpace.OMR.CSTMRunSetting and placed into the variable a. Line number 1990 shows a join between variable a and temporary variable (#tmp) b on the job_id variable included in both a and b.

At line numbers 1993 and 1994, a SQL query shows selecting all records from the temporary variable.

At line numbers 1997, 1998 and 1999, a SQL query shows updating the temporary variable. The SQL query includes setting the output_month variable of the records to 100 where the job_id variable is 550 or 1208.

FIG. 3 shows illustrative diagram 300. Illustrative diagram 300 shows exemplary SQL queries. Section 302 may correspond to line numbers in a query. Section 304 may correspond to the language of a query. Section 306 may correspond to the results of the execution of a query.

At line numbers 1974 and 1975, a SQL query may select the top thirty records from a data file named CLMSReporting.dbo.vwOverLayMainData.

At line numbers 1977-1980, a SQL query may select all records. Selection of all records may be indicated by the (*) indicator. The records may be selected from a data file named CLMSUserSpace.OMR.CSTMRunSetting. The records may be selected when the variable fcst_cycle, included in the records, is equivalent to 202110. Line number 1979 may indicate a commented-out portion of the query which states, 'where portfolio_id like '%202003%'.

At line numbers 1981-1983, a SQL query may update CLMSUserSpace.OMR.CSGMRunSetting by setting the portfolio id to '202003_BT_CCBR_BackBook_P5_ME' in records where the job_id field is equivalent to 1231.

Line numbers 1985-1989 show a query. The query includes selecting all records from the data set a that have common set of columns within a. Line numbers 1985-1986 show selecting all records from a memory location. The memory location may be CLMSUserSpace.OMR.CSTMRunSetting. The memory location may be identified as variable a. Line 1987 shows a join. A join may indicate one or more sets of data fields that may be similar in a first data set and a second data set. The one or more sets of fields may enable the query to compare the first data set to the second data set. The join may include joining a temporary file b with data set a. The set of fields with which to join data set a and data set b may be a.job_id and b.job_id. As such, the comparison between data set a and data set b may be based on the equivalence of the job_id field in data set a and data set b. Line number 1988 shows a where clause that may limit the SQL query. A where clause may enable the query to select data records that fulfill the limitation of the where clause. The where clause may identify which records to retrieve from the data sets. The where clause shown may enable the query to retrieve records for which the following is true: the output_month field identified in data set a is not equivalent to the output_month field identified in data set b, or the scenario_cycle field identified in data set a is not equivalent to the scenario_cycle field identified in data set b or the sandbox field identified in data set a is not equivalent to the sandbox field identified in data set b.

Line numbers 1993 and 1994 may show a tie query, also referred to as a tie function. The tie function may compare two data sets. The tie function may accept parameters. Each of the parameters may be recited in greater detail in connection with FIG. 9.

Line numbers 1985 through 1989 may have been executed. As such, results section 306 may include the results of the execution of line numbers 1985 through 1989. Results section 306 may display the data records associated with job identifiers 550 and 1200 that have been retrieved from data set a.

As such, the system may identify that data records associated with job identifiers 550 and 1200 may include differences between data set a and data set b. Although a user may be able to locate the differences by examining the two data records, the user may not be informed where the differences are located. It should be noted that, it may be difficult to identify the differences especially when there are a large number of corresponding data records that differ from one another.

FIG. 4 shows illustrative diagram 400. Illustrative diagram 400 shows exemplary SQL queries. Section 402 may correspond to line numbers in the query. Section 404 may correspond to the language of the query. Section 406 may correspond to the section of the SQL query currently executed. Section 408 may correspond to the results of the execution of a query.

The queries shown in line numbers 1974-1983 and 1993-1994 may be discussed in connection with FIG. 3.

Section 406 shows a SQL query. The SQL query may compare a data set identified as a to a data set identified as b. The job_id field may be used to join data set a to data set b. The SQL query shows identifying data records that include differences in the output_month, scenario_cycle or sandbox columns. The query may order the results by the job id.

Section 408 shows the results of the executed SQL query. Data records that may be identified by job_ids 550 and 1208 may include differences between the data record included in the data set identified as a and the data identified as b.

FIG. 5 shows illustrative diagram 500. Illustrative diagram 500 shows exemplary SQL queries. Section 502 may correspond to line numbers in the query. Section 504 may correspond to the language of the query. Section 506 may correspond to the section of the SQL query currently executed. Sections 508 and 510 may correspond to the results of the execution of the SQL query currently executed.

There may be two sections to the SQL query shown at 506. A first section of the SQL query may be executed on a data set identified as a. The result set of the first section of the SQL query may be shown at 508. A second section of the SQL query may be executed on a data set identified as b. The result set of the second section of the SQL query may be shown at 510.

The first section of the SQL query may include query components. A first component may include selecting the job_id field, the output_month field and the scenario_cycle field from a data set identified as a. A second component may include joining the data set identified as a with the data set identified as b using the job_id field. A third component may include limiting the query to data records where the output_month field or the scenario_cycle field or the sandbox field are not the same in the a data set and the b data set. A fourth component may include ordering the result set first by the job_id field, then by the output_month field and then by the scenario_cycle field.

The second section of the SQL query include query components. A first component may include selecting the job_id field, the output_month field and the scenario_cycle field from a data set identified as b. A second component may include joining the data set identified as a with the data set identified as b using the job_id field. A third component may include limiting the query to data records where the output_month field or the scenario_cycle field or the sandbox field are not the same in the a data set and the b data set. A fourth component may include ordering the result set first by the job_id field, then by the output_month field and then by the scenario_cycle field.

As viewable at result sets shown in sections 508 and 510, the data records identified by job identifiers 550 and 1208 may have been assigned 72 in the output_month field of the data set identified as a, and assigned 100 in the output_month field of the data set identified as b. These differences may be viewable to a reader. However, in its current state the system may not be able to present the exact differences to the user. As such, further data manipulation, as shown at FIG. 7 may be utilized in order for the system to present the differences to the user.

Figure 6:
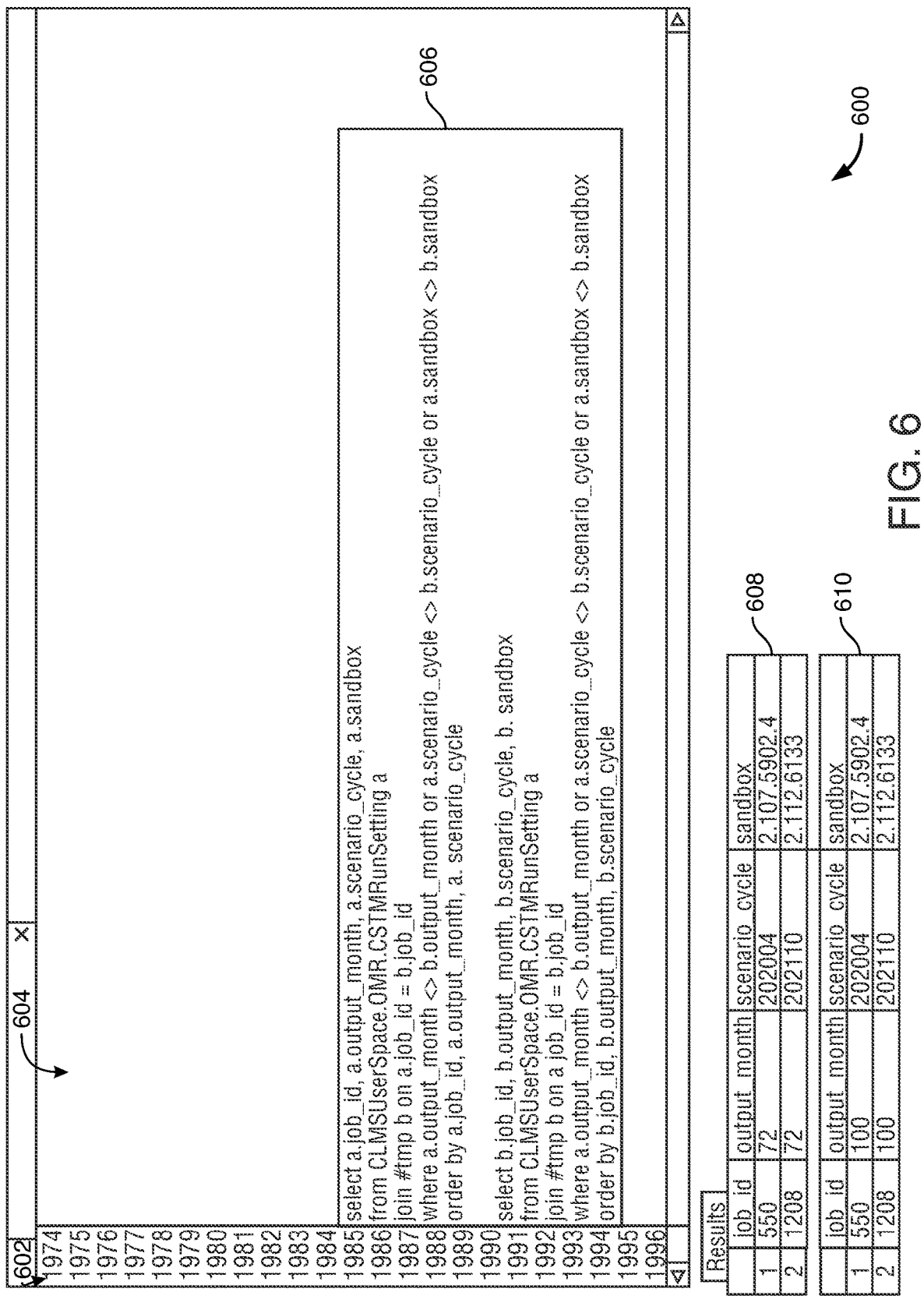
FIG. 6 shows still another illustrative diagram in accordance with principles of the disclosure.

FIG. 6 shows illustrative diagram 600. Illustrative diagram 600 shows exemplary SQL queries. Section 602 may correspond to line numbers in the query. Section 604 may correspond to the language of the query. Section 606 may correspond to the section of the SQL query currently executed. Sections 608 and 610 may correspond to the results of the execution of the SQL query currently executed.

There may be two sections to the SQL query shown at 606. A first section of the SQL query may be executed on a data set identified as a. The result set of the first section of the SQL query may be shown at 608. The second section of the SQL query may be executed on a data set identified as b. The result set of the second section of the SQL query may be shown at 610.

The first section of the SQL query includes query components. A first component may include selecting the job_id field, the output_month field, the scenario_cycle field and the sandbox field from a data set identified as a. A second component may include joining the data set identified as a with a data set identified as b using the job_id field. A third component may include limiting the query to data records where the output_month field or the scenario_cycle field or the sandbox field are not the same in the a data set and the b data set. A fourth component may include ordering the result set first by the job_id field, then by the output_month field and then by the scenario_cycle field.

The second section of the SQL query includes query components. A first component includes selecting the job_id field, the output_month field, the scenario_cycle field and the sandbox field from a data set identified as b. A second component includes joining the data set identified as a with a data set identified as b using the job_id field. A third component includes limiting the query to data records where the output_month field or the scenario_cycle field or the sandbox field are not the same in the a data set and the b data set. A fourth component includes ordering the result set first by the job_id field, then by the output_month field and then by the scenario_cycle field.

As viewable at result sets shown in sections 608 and 610, the data records identified by job identifiers 550 and 1208 may have been assigned 72 in the output_month field of the data set identified as a, and assigned 100 in the output_month field of the data set identified as b. These differences may be viewable to a reader. However, in its current state the system may not be able to present the exact differences to the user. As such, further data manipulation, as shown at FIG. 7 may be utilized in order for the system to present the differences to the user.

It should be noted that result sets 608 and 610 may be combined to enable the system to identify the differences. FIGS. 7 and 8 show the combination and manipulation of such result sets.

FIG. 7 shows an illustrative diagram 700. Illustrative diagram 700 may include section 702, section 704, section 706 and section 708. Section 702 may be a copy of the result set shown in section 608 in FIG. 6. Section 704 may be copy of the result set 610 shown at FIG. 6.

After obtaining results sets shows in sections 702 and 704, a next step in identifying differences may include transposing each of the result sets in memory. The transposition of the result set, shown in section 702, may be shown at 706. The transposition of the result set, shown in section 704, may be shown at 708.

FIG. 8 shows an illustrative diagram. Section 802 may correspond to section 702. Section 804 may correspond to section 704. Section 806 may correspond to section 706 and section 808 may correspond to section 708.

Section 810 shows a line-by-line comparison between record 1, included in data set a and record 1, included in data set b. Section 810 also shows a line-by-line comparison between record 2, included in data set a and record 2 included in data set b. Such a line-by-line comparison may be easily reviewed and worked on by the system. As such, the system may present to a user the differences between a first big data set and a second big data set.

FIG. 9 shows an illustrative diagram. The diagram shows functions that can be used by a user to interface with a data reconciliation system for big data. Title 902 indicates that FIG. 9 includes the data reconciliation system functions. The functions may be included in a query or in a method that is executed by the system to provide data reconciliation for big data.

Code segment 904 shows a sample method that receives parameters. The method may tie out (or determine discrepancies between) two Spark® or Pandas® data frames, as shown at 906. Spark®, Pandas®, Python® and Hadoop® are infrastructure and resources upon which programs and application are built. Spark® data frames may be used to compare big data sets. Pandas® data frames may be used to compare two small or medium sized data sets. The parameters may be entered by a user. The user-entered parameters may correspond to the data types shown in code segment 904.

The names of the parameters receivable at 904 may include the following: data1, data2, spark, dims, metrics_exclude, metrics_substr_exclude, mumeric_threshold, intersection, fields_mapping, verbose and show_stats). Index 908 describes each of the parameters and associated definitions.

Parameter data1 may relate to a Spark® or Pandas® data frame. The Spark® or Pandas® data frame may include a first data set. As such, data1 may refer to a first data set to be compared. The information entered by a user may include an address or memory location of the Spark® or Pandas® data frame that includes the first data set.

It should be noted that memory may refer to physical data storage locations. Such physical data storage locations may store data for continuous time periods.

Memory may also refer to one or more memory locations into which data sets are read in order to be manipulated by a data reconciliation algorithm. Data loaded into memory locations from which data sets are read may not be held in such memory constantly. Rather, once the data has been manipulated, the data may be removed from such memory. Also, big data sets, such as those that involve a Spark® data frame, may not fit into such memory at one time. Therefore, lazy evaluation may be used to read the data into such memory. Lazy evaluation may be an evaluation strategy which delays the loading of the data until the data is demanded by the algorithm. Lazy evaluation may enable sections of the big data sets to be read into, and manipulated by, the algorithm. Additionally, sections of the big data sets may be read into one or more such memory locations in order to enable parallel execution of the data sets.

Parameter data2 may relate to a Spark® or Pandas® data frame. The Spark® or Pandas® data frame may include a second data set. As such, data2 may refer to a second data set to be compared to the first data set. The information entered by a user may include an address or memory location of the Spark® or Pandas® data frame that includes the second data set.

Parameter spark may relate to a Spark® instance. The Spark® instance may be identified or located when a Spark® instance is related to data1 or data2. When the spark parameter is set to none, a pandas data frame is being used.

Parameter dims may relate to a set of fields, such as a set of rows, a set of columns and/or set of cells with which to join data1 to data2. As such, the data indicated in the dimensions' ("dims") parameter may be the similarity between data1 to data2. At times, the user may assign a null value to the dims parameter. As such, the system may attempt to locate the set of fields in both data1 and data2 that can be joined.

Parameter metrics_exclude may relate to a set of fields that can be excluded from reconciliation. Parameter metrics_exclude may accept a specific field listing, such as row and column line data. Parameter metrics_substr_exclude may also relate to a set of fields that can be excluded from the reconciliation. Parameter metrics_substr_exclude may accept a substring. The substring may indicate a pattern. Fields that match the indicated pattern may be excluded from the reconciliation.

Parameter numeric_threshold may relate to a numerical threshold of differences that are referred to herein, for the purpose of this application, as differences. The default value may be 0.01. Such a parameter may be useful when considering whole integer values as opposed to decimal values. In such an embodiment—i.e., an embodiment that compares whole integer values to decimal values—the parameter may be set to 1.0.

Parameter intersection_only may, in certain embodiments, identify a set of fields to be used in the comparison. Such a parameter may be used when data1 has 100 values and data2 has 200 values. After the one hundred value comparison between data1 and data2, the system may preferably stop identifying differences. When parameter intersection_only is set to true, the comparison may be restricted to involve the common dataset between data1 and data2.

Parameter fields_mapping may be used to identify a dictionary of mapping between two data sets. Parameter field mapping may be used to compare two data sets that are named differently. At times, a user may attempt compare data1 to data2, however the fields in data1 may be named differently from the fields in data2. Parameter fields_mapping describes a bridge between the two data sets—i.e., which fields in data1 correspond to which fields in data2.

Parameter verbose may be used to customize the log message displayed to the user. The verbose parameter may determine how detailed the information is included in the log message. When verbose is set to true, the log message is more detailed. When verbose is set to false, the log message may be less detailed.

Parameter show_stats may identify whether or not the identified differences are displayed to the user. The default of show_stats may be set to false. As such, if the user does not indicate whether the differences should be displayed, differences are not displayed. The reason that the default is set to false is that initially a user may determine if there are differences. If there are no differences, there is no need for the parameter show_stats to be set to true. Setting show_stats to false may shorten query time. However, if differences are determined, the query can be executed again with show_stats being set to true.

The return indicator indicates a list of three Pandas® data frames. The three Pandas® data frames may include differences samples, differences stats and differences breakdown.

It should be appreciated that parameters data1 and data2 may not be optional.

Sample methods and parameter identification are shown at 910. A first sample method may be shown at 912. Data1 may be selected from a location within a Spark® instance. As such, data1 may be set to spark.sql('select * from wra_gcp_cns_output.cstm2_portfolio_output_all1 where job_id=281475'). Data2 may be selected from another location within a Spark® instance. As such, data2 may be set to spark.sql('select * from md1_cstm_1.all1_out where job_id= 1003'). Data1 and data2 may be used to identify the diff variable. The diff variable may be a variable name that identifies the following method tieout_dfs (data1, data2, spark, dims=['accountid', 'actdate'], metrics_exclude=['insert_ts', 'portfolio_id', 'portfolio desc', 'job_id'], fields_mapping={'misc_fees': 'miscfee', 'billedannualfee': 'annualfee', 'billedlatefee': 'latefee'}). The diff method may compare data1 to data2. The diff method may utilize the account ID and account date field as the join fields. The diff method may exclude the following fields from the comparison: the insert_ts fields, the portfolio ID field, the portfolio description field and the job ID field. Fields mapping parameter shows that misc_fees in data1 corresponds to miscfee is data2, billedannualfee in data1 corresponds to annualfee in data2 and billedlatefee in data1 corresponds to latefee in data2.

A second sample method may be shown at 914. Data1 may be retrieved from pd.read_csv ('/project/usrwrk/md1/gra/app/model_runner/model_runner/cstm/assumptions/20-1901_bacb 1.csv'). Data1 may be retrieved from pd.read.csv ('/project/usrwrk/md1/gra/app/model_runner/model_runner/cstm/assumptions/201901_bacb 1_v3.csv'). The diff variable may identify a tieout_dfs method that accepts the following parameters: data1 and data2. As such, method may compare data1 to data2 using the default values described above.

FIGS. 10-13 show use cases that utilize the big data reconciliation system.

FIGS. 10A, 10B, 10C and 10D show a first use case for reconciling data between different systems. A subset of the first use case may include reconciling finance rates data between Vertica® and Hive®, as shown in FIG. 10A. Vertica® is an analytic database management software. Hive® is a distributed, fault-tolerant data warehouse system that enables data analytics in a big data environment.

Code segment 1004 in FIG. 10A shows importing libraries that may be used in the data reconciliation. Code segment 1006 in FIG. 10A shows setting the variables data1 and data2 to specific memory locations. Code segment 1006 in FIG. 10A also shows executing the data reconciliation algorithm between data1 and data2. The instance used to identify the differences may be a Spark® data frame instance.

Code segment 1008 in FIG. 10A shows an exemplary stage 14 of a log file produced by executing the executable included in code segment 1006. Stage 14 shows a match between data1 and data2 indicated by a record count. Stage 14 also shows that a column named 'insert_ts'' is included in data2, however, such a column is not found in data1.

Code segment 1010 in FIG. 10A shows an exemplary stage 22 of the log file produced by executing the executable included in code segment 1006. Stage 22 shows that the record join count matches, and that the records have been reconciled with differences within 0.01 in metric fields and exact match in non-metric fields.

Code segment 1012 in FIG. 10B shows data types included in data1. Code segment 1014 in FIG. 10B shows data types included in data2. The system may review the data types included in data1 and data2 to identify a set of dimension fields. Code segment 1016 in FIG. 10B shows dimension fields, included in both data1 and data2, which may be used to join data1 and data2.

A subset of the first use case may include reconciling finance rates data between Teradata® and Hive®, as shown at 1018 in FIG. 10C. Teradata® is an enterprise analytic database system. Hive® is a distributed, fault-tolerant data warehouse system that enables data analytics in a big data environment.

Code segment 1020 in FIG. 10C shows setting the variables data1 and data2 to specific memory locations. Code segment 1020 also shows executing a data reconciliation algorithm between data1 and data2. A Spark® data frame instance may be used to reconcile data1 with data2. The dimension fields may be specified by the user. The dimension field may be accountid.

Stage 26, shown at 1022, shows that the record counts match. As shown at 1024, there may be schema differences between data1 and data1. These schema differences may include additional columns in data2. These schema differences may also include mismatched data types which may be excluded from the comparison. The mismatched datatypes may be displayed in the log file shown. Stage 34, as shown at 1026, shows that the record join count matches and the joined records have been reconciled within differences within 0.01 in metric fields and exact match in non-metric fields.

Code segment 1028 shows a similar code example to code segment 1020. However, in 1028, the columns included in data1, that were not able to be reconciled in code segment 1020 because of the mismatched data type, are converted to a string. Accordingly, code segments 1020 and 1032 show that the converted files are able to be reconciled.

FIGS. 11A, 111B, 11C, 11D and 11E show a second use case. The second use case shows the impact analysis of the data reconciliation system in model development.

A subset of the second use case may include reconciling CSTM V3 201812 Backbook Model Results, as shown at 1102 in FIG. 11A.

Code segment 1104 in FIG. 11A shows setting the variables data1 and data2 to specific locations in memory. Code segment 1104 also shows converting a subset of fields included data2 to a string data type. Code segment 1104 also shows executing a data reconciliation query. The data reconciliation system may receive parameters. The parameters may include data1 and data2. The dimension parameters, which may be used to join data1 with data2, may be assigned account id and account date. The excluded fields may be insert_ts, job_id and portfolio_id. The query may display the results, as indicated that the show_stats parameter is set to True.

At stage 328, shown at 1106 in FIG. 11A, the log file may indicate that the record counts match. At stage 386, shown at 1108 in FIG. 11A, the log file may indicate that there are 94.3% of records with differences. At stage 432, shown in 1110 in FIG. 11A, the log file may indicate that differences exist in 16 out of 22 fields. At stage 482, shown at 1114 in FIG. 11B, the log file indicates the records with the differences. Numeric values indicated by 1116 in FIG. 11B and 1118 in FIG. 11B show significant differences.

A second subset of the second use case may include Reconciling CSTM v3 201812 Backbook Portfolio Data, as shown at 1119 in FIG. 11C.

Code segment 1120 shows setting each of the data1 and data2 to specific memory locations or retrieving each of the data1 and data2 to specific memory locations. Code segment 1120 may also include executing a data reconciliation query. The data reconciliation query may utilize data1 and data2. The query may utilize an account identifier as the dimension field. The query may map the field prod_acct_no_tu_ccba to the account id field. The query may display the results to the user, as shown at show_stats is set to true.

Code segment 1122 shows that record count does not match. However, the record may be able to be joined. Code segment 112 shows that 100% of the records may have differences.

Stage 76, shown at 1124 in FIG. 11C, shows the fields in which the differences are located. Stage 117, shown at 1126 in FIG. 11D shows a listing of the differences. Stage 168, shown at 1128 in FIG. 11E shows the breakdown of differences in 10 non-numeric fields. The breakdown may involve a count of the differences between data1 and data2.

FIGS. 12A and 12B show a third use case. The third use case may involve reconciling macroeconomic data from EVER downloads. The third use case may involve a sub-use case. The sub-use case may include reconciling different versions of macroeconomic data from EVER download, as shown at 1202 in FIG. 12A.

Code segment 1204 in FIG. 12A may show selecting and displaying data from a spark data frame in order for a user to view the data.

Code segment 1208 in FIG. 12A may involve assigning the data1 and data2 variables data from the selected Spark® data frame. Code segment 1208 may also involve identifying variables within the data reconciliation query.

Stage 166 shown at 1210 in FIG. 12A shows that the record counts do not match between the two data sets. However, stage 174 shown at 1212 shows that the records can be joined and that the joined records have been reconciled.

A second sub-use case of the third use case may involve reconciling macro data in a Pandas® data frame, as shown at 1214 in FIG. 12B. Code segment 1216 in FIG. 12B involves setting each of data1 and data2 to specific variables. Code segment 1216 in FIG. 12B may also involve a data reconciliation query that compares data1 to data2. The show_stats parameter may be set to true. Therefore, the results of the query are displayed to a user as shown at 1218.

FIGS. 13A, 13B and 13C show a fourth use case for the data reconciliation query system. Such a use case may be integrated in Pytest® for Test-Driven Development. Pytest® may be a testing framework based on Python®. FIG. 13A shows code segment 1302. Code segment 1302 involves assigning memory locations to data1 and data2 and executing a data reconciliation query.

FIG. 13B shows code segments 1304 and 1306. Code segments 1304 and 1306 involves assigning memory locations to data1 and data2 and executing a data reconciliation query.

FIG. 13C shows code segment 1308 and 1310. Code segment 1308 involves assigning memory locations to data1 and data2 and executing a data reconciliation query.

Figure 14:
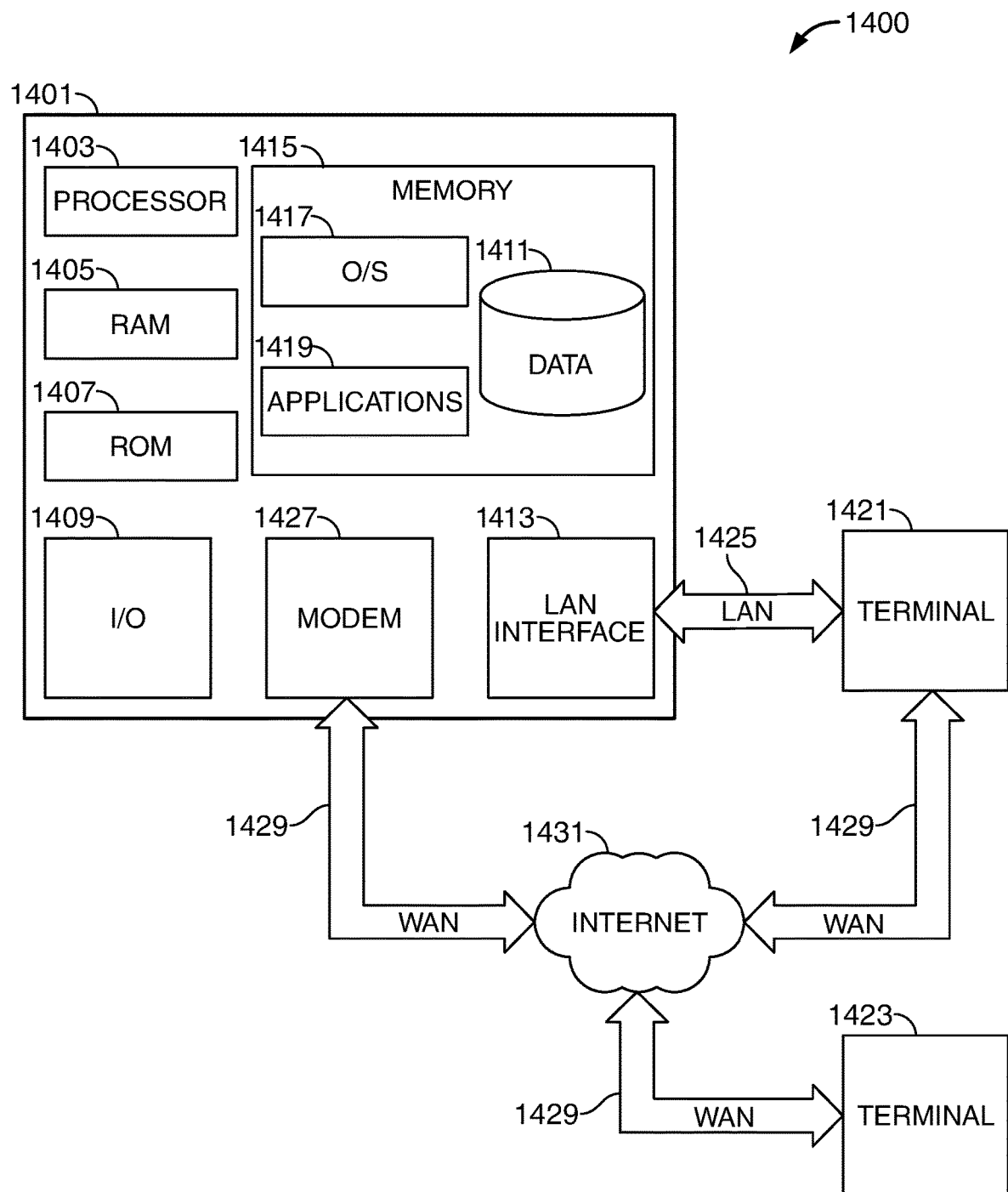
FIG. 14 shows still another illustrative diagram in accordance with principles of the disclosure.

FIG. 14 shows an illustrative block diagram of system 1400 that includes computer 1401. Computer 1401 may alternatively be referred to herein as an "engine," "server" or a "computing device." Computer 1401 may be a workstation, desktop, laptop, tablet, smartphone, or any other suitable computing device. Elements of system 1400, including computer 1401, may be used to implement various aspects of the systems and methods disclosed herein. Each of the data reconciliation systems, methods and algorithms illustrated in FIGS. 1-13 may include some or all of the elements and apparatus of system 1400.

Computer 1401 may have a processor 1403 for controlling the operation of the device and its associated components, and may include RAM 1405, ROM 1407, input/output circuit 1409, and a non-transitory or non-volatile memory 1415. Machine-readable memory may be configured to store information in machine-readable data structures. The processor 1403 may also execute all software running on the computer. Other components commonly used for computers, such as EEPROM or Flash memory or any other suitable components, may also be part of the computer 1401.

The memory 1415 may be comprised of any suitable permanent storage technology—e.g., a hard drive. The memory 1415 may store software including the operating system 1417 and application(s) 1419 along with any data 1411 needed for the operation of the system 1400. Memory 1415 may also store videos, text, and/or audio assistance files. The data stored in memory 1415 may also be stored in cache memory, or any other suitable memory.

Input/output ("I/O") module 1409 may include connectivity to a microphone, keyboard, touch screen, mouse, and/or stylus through which input may be provided into computer 1401. The input may include input relating to cursor movement. The input/output module may also include one or more speakers for providing audio output and a video display device for providing textual, audio, audio-visual, and/or graphical output. The input and output may be related to computer application functionality.

System 1400 may be connected to other systems via a local area network (LAN) interface 1413. System 1400 may operate in a networked environment supporting connections to one or more remote computers, such as terminals 1421 and 1423. Terminals 1421 and 1423 may be personal computers or servers that include many or all of the elements described above relative to system 1400. The network connections depicted in FIG. 14 include a local area network (LAN) 1425 and a wide area network (WAN) 1429 but may also include other networks. When used in a LAN networking environment, computer 1401 is connected to LAN 1425 through a LAN interface 1413 or an adapter. When used in a WAN networking environment, computer 1401 may include a modem 1427 or other means for establishing communications over WAN 1429, such as Internet 1431.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 1419, which may be used by computer 1401, may include computer executable instructions for invoking functionality related to communication, such as e-mail, Short Message Service (SMS), and voice input and speech recognition applications. Application program(s) 1419 (which may be alternatively referred to herein as "plugins," "applications," or "apps") may include computer executable instructions for invoking functionality related to performing various tasks. Application program(s) 1419 may utilize one or more algorithms that process received executable instructions, perform power management routines or other suitable tasks. Application program(s) 1419 may utilize one or more decisioning processes for the processing of calls received from calling sources as detailed herein.

Application program(s) 1419 may include computer executable instructions (alternatively referred to as "programs"). The computer executable instructions may be embodied in hardware or firmware (not shown). The computer 1401 may execute the instructions embodied by the application program(s) 220 to perform various functions.

Application program(s) 1419 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 1411, and any other suitable information, may be stored in memory 1415.

The invention may be described in the context of computer-executable instructions, such as application(s) 1419, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 1401 and/or terminals 1421 and 1423 may also include various other components, such as a battery, speaker, and/or antennas (not shown). Components of computer system 1401 may be linked by a system bus, wirelessly or by other suitable interconnections. Components of computer system 1401 may be present on one or more circuit boards. In some embodiments, the components may be integrated into a single chip. The chip may be silicon-based.

Terminal 1421 and/or terminal 1423 may be portable devices such as a laptop, cell phone, tablet, smartphone, or any other computing system for receiving, storing, transmitting and/or displaying relevant information. Terminal 1421 and/or terminal 1423 may be one or more user devices. Terminals 1421 and 1423 may be identical to system 1400 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 15:
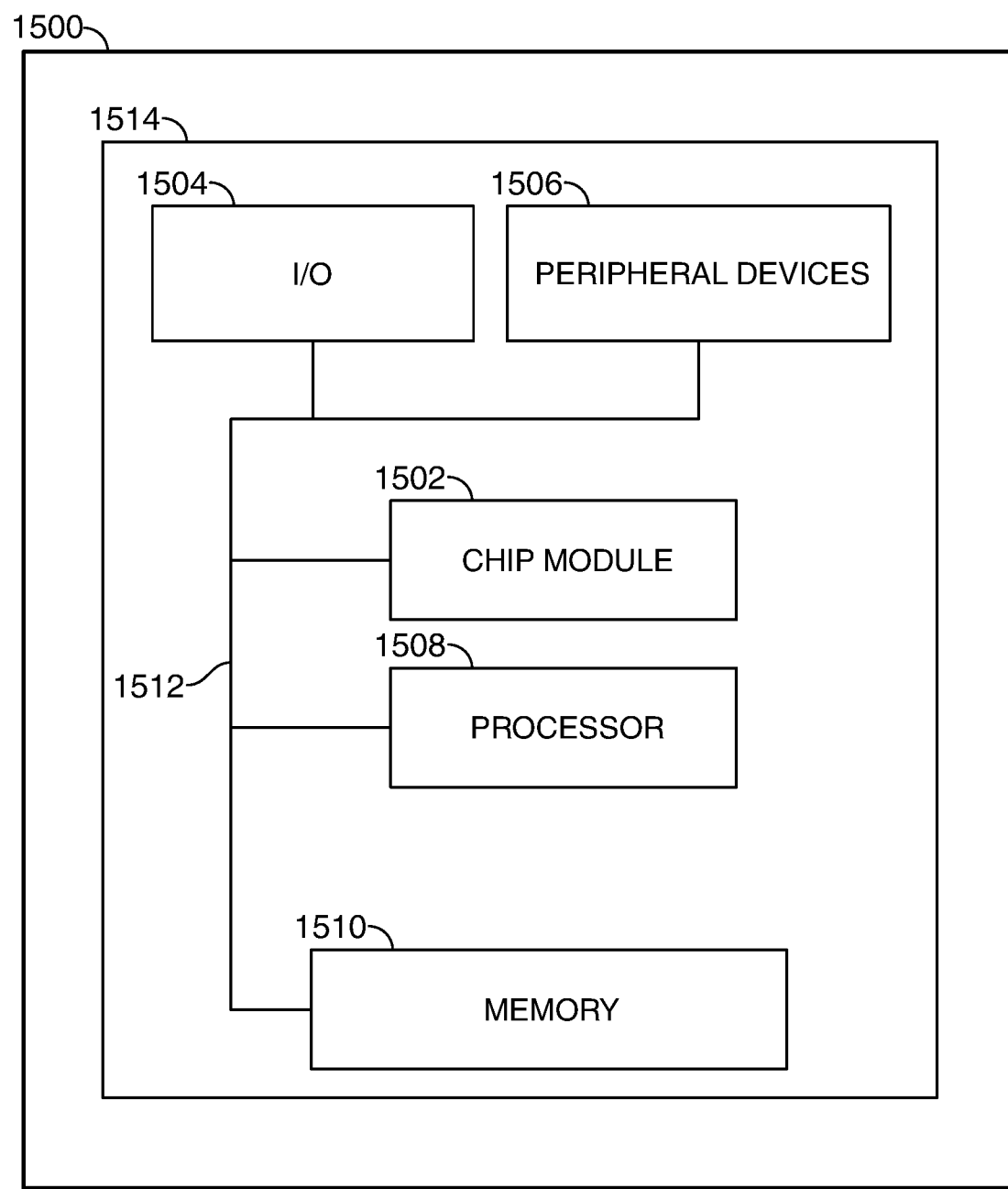
FIG. 15 shows yet still another illustrative diagram in accordance with principles of the disclosure.

FIG. 15 shows illustrative apparatus 1500 that may be configured in accordance with the principles of the disclosure. Apparatus 1500 may be a computing device. Apparatus 1500 may include one or more features of the apparatus shown in FIG. 14. Apparatus 1500 may include chip module 1502, which may include one or more integrated circuits, and which may include logic configured to perform any other suitable logical operations.

Apparatus 1500 may include one or more of the following components: I/O circuitry 1504, which may include a transmitter device and a receiver device and may interface with fiber optic cable, coaxial cable, telephone lines, wireless devices, PHY layer hardware, a keypad/display control device or any other suitable media or devices; peripheral devices 1506, which may include counter timers, real-time timers, power-on reset generators or any other suitable peripheral devices; logical processing device 1508, which may compute data structural information and structural parameters of the data; and machine-readable memory 1510.

Machine-readable memory 1510 may be configured to store in machine-readable data structures: machine executable instructions, (which may be alternatively referred to herein as "computer instructions" or "computer code"), applications such as applications 1419, signals, and/or any other suitable information or data structures.

Components 1502, 1504, 1506, 1508 and 1510 may be coupled together by a system bus or other interconnections 1512 and may be present on one or more circuit boards such as circuit board 1514. In some embodiments, the components may be integrated into a single chip. The chip may be silicon-based.

Thus, a big data reconciliation system is provided. Persons skilled in the art will appreciate that the present invention can be practiced by other than the described embodiments, which are presented for purposes of illustra-

What is claimed is:

1. A method for reconciling data in a big data environment, the method comprising:
   receiving, using a lazy evaluation algorithm, a first data set and a second data set for reconciliation, the lazy evaluation algorithm delays loading data included in the first data set and the second data set until the data is demanded by a loading algorithm;
   identifying a first set of metadata associated with the first data set;
   identifying a second set of metadata associated with the second data set;
   comparing the first set of metadata to the second set of metadata to obtain a subset of data found within the first data set and a subset of data found within the second data set that are joinable;
   dynamically constructing one or more structured query language (SQL) queries to identify any discrepancies between the first data set and the second data set; and
   executing the one or more SQL queries that identify any discrepancies between the first data set and the second data set.

2. The method of claim 1, wherein each of the first set of metadata and the second set of metadata comprises schema and data type data.

3. The method of claim 1, wherein each of a physical data memory location of the first data set and a physical memory location of the second data set are located at different data locations.

4. The method of claim 1, wherein the subset of data within the first data set is a primary key of the first data set and the subset of data within the second data set is a primary key of the second data set.

5. The method of claim 1, wherein each of the first data set and the second data set has a size of greater than 5 terabytes.

6. A method for performing data reconciliation in a big data environment, the method comprising:
   receiving, using a lazy evaluation algorithm, identification of a first big data set and identification of a second big data set, the lazy evaluation algorithm delays loading data included in the first big data set and the second big data set until the data is demanded by a loading algorithm;
   identifying a first set of metadata associated with the first big data set, the first set of metadata comprising schema information and data type information of the first big data set;
   identifying a second set of metadata associated with the second big data set, the second set of metadata comprising a set of schema information and a set of data type information of the second big data set;
   identifying a first subset of metadata within the first set of metadata and a second subset of metadata within the second set of metadata, the first subset corresponding to the second subset of metadata;
   generating a dimension, based on the first subset of metadata, that corresponds to the second subset of metadata, said dimension including a first set of fields from the first big data set and a second set of fields from the second big data set, wherein the first set of fields corresponds to the second set of fields;
   dynamically constructing a structured query language (SQL) query to compare the first big data set to the second big data set, said constructing using the dimension as a join set of data fields within the SQL query, the SQL query further comprising a where clause, the where clause including each of a set of column names in the first big data set that correspond to a second set of column names in the second big data set;
   executing the SQL query on the first big data set and the second big data set; and
   generating a result set from the SQL query.

7. The method of claim 6, further comprising:
   identifying that the result set is empty;
   based on the empty result set, identifying that there are no differences between the first big data set and the second big data set; and
   presenting to a user that a data reconciliation between the first big data set and the second big data set obtain a no differences result.

8. The method of claim 6, further comprising:
   identifying that the result set includes one or more differences, the result set comprising one or more columns that are included in the first big data set that correspond to one or more columns that are included in the second big data set;
   ordering the result set by the differences included a first column of the one or more columns, where the differences are included in a top portion of the first column;
   selecting a first predetermined number of rows in the ordered result set;
   transposing the first predetermined number of rows in the ordered result set, wherein the columns become rows and the rows become columns;
   identifying a subset of the differences along a first row that corresponds to the first column;
   selecting the subset of the differences from the first row;
   dynamically reconstructing the SQL query by removing the first column from the SQL query;
   executing the reconstructed SQL query;
   identifying that the result set includes a second subset of one or more differences, the result set comprising one or more columns that are included in the first big data set that correspond to one or more columns that are included in the second big data set;
   ordering the result set by the second subset of the differences included in a subsequent column of the one or more columns, where the second subset of the differences are included in the top portion of the subsequent column;
   selecting a subsequent predetermined number of rows in the ordered result set;
   transposing the subsequent predetermined number of rows in the ordered result set, wherein the columns become rows and the rows become columns;
   identifying the second subset of the differences along a subsequent row that corresponds to the subsequent column;
   selecting the second subset of the differences from the subsequent row; and
   upon completion of identifying differences between the first big data set and the second big data, displaying the differences from each of the rows.

9. The method of claim 8, further comprising executing, in parallel, the SQL query and the reconstructed SQL query.

10. The method of claim 6, the SQL query is:
   select a first column from the first data set and second column from the second big data set;
   join the first data set with the second big data set on a link between the selected first column and the selected second column;

where a corresponding cell in a third column of the first data set is not equal to a cell in a fourth column of the second big data set or a corresponding cell in a fifth column of the first data set is not equal to a cell in a sixth column of the second big data set or a corresponding cell in a seventh column in the first data set is not equal to a cell in an eighth column of the second big data set; and order by the first column, then by the third column, then by the fifth column then by the eighth column.

11. The method of claim 6, wherein the first big data set and the second big data set each have a size greater than 5 terabytes.

12. The method of claim 6, wherein the first set of fields from the first big data set is a primary key of the first big data set and the second set of fields from the second big data set is a primary key of the second big data set.

13. A method for data reconciliation in a big data environment, the method comprising:
   receiving, using a lazy evaluation algorithm, identification of a first big data set and a second big data set, the lazy evaluation algorithm delays loading data included in the first big data set and the second big data set until the data is demanded by a loading algorithm;
   receiving a dimension, said dimension including a first set of fields from the first big data set and a second set of fields from the second big data set, wherein the first set of fields correspond to the second set of fields;
   dynamically constructing a structured query language (SQL) query to compare the first big data set to the second big data set, the dimension is used as a join set of data fields within the SQL query, the SQL query comprising a where clause, the where clause including each of a set of column names in the first big data set that correspond to column names in the second big data set;
   executing the SQL query on the first big data set and the second big data set;
   generating a result set from the SQL query, the result set comprising one or more columns that are included in the first big data set that correspond to one or more columns that are included in the second big data set;
   identifying that the result set includes one or more differences;
   ordering the result set by the one or more differences included in a first column of the one or more columns, the one or more differences are included in a top portion of the first column;
   selecting a first predetermined number of rows in the ordered result set;
   transposing the first predetermined number of rows in the ordered result set, wherein the columns become rows and the rows become columns;
   identifying a first set of differences along a first row that corresponds to the first column;
   selecting the differences from the first row;
   dynamically reconstructing the SQL query by removing the first column from the SQL query;
   executing the reconstructed SQL query;
   generating an updated result set;
   identifying that the updated result set includes one or more differences;
   ordering the result set by the differences included a subsequent column of the one or more columns, where the differences are included in a top portion of the subsequent column;
   selecting a subsequent predetermined number of rows in the ordered result set;
   transposing the subsequent predetermined number of rows in the ordered result set, wherein the columns become rows and the rows become columns;
   identifying the differences along one or more subsequent rows that correspond to the subsequent column;
   selecting a second set of differences from the one or more subsequent rows; and
   upon completion of identifying differences between the first big data set and the second big data, displaying the first set of differences and the second set of differences.

14. The method of claim 13, further comprising executing, in parallel, the SQL query and the reconstructed SQL query.

15. The method of claim 13, the SQL query is:
   select a first column from the first data set and second column from the second data set;
   join the first data set with the second data set on a link between the selected first column and the selected second column;
   where a corresponding cell in a third column of the first data set is not equal to a cell in a fourth column of the second data set or a corresponding cell in a fifth column of the first data set is not equal to a cell in a sixth column of the second data set or a corresponding cell in a seventh column in the first data set is not equal to a cell in an eighth column of the second data set; and
   order by the first column, then by the third column, then by the fifth column then by the eighth column.

16. The method of claim 13, wherein the first big data set and the second big data set each have a size greater than 5 terabytes.

17. The method of claim 13, wherein the first set of fields from the first big data set is a primary key of the first big data set and the second set of fields from the second big data set is a primary key of the second big data set.

18. A data reconciliation system for big data, the system comprising:
   a receiver configured to receive:
      identification of a first big data set and a second big data set using a lazy evaluation algorithm, the lazy evaluation algorithm delays loading data included in the first big data set and the second big data set until the data is demanded by a loading algorithm; and
      a dimension, said dimension including a first set of fields from the first big data set and a second set of fields from the second big data set, wherein the first of fields correspond to the second set of fields;
   a processor configured to:
      dynamically construct a structured query language (SQL) query to compare the first big data set to the second big data set, the dimension is used as a join set of data fields within the SQL query, the SQL query comprising a where clause, the where clause including each of a set of column names in the first big data set that correspond to column names in the second big data set;
      execute the SQL query on the first big data set and the second big data set;
      generate a result set from the SQL query, the result set comprising one or more columns that are included in the first big data set that correspond to one or more columns that are included in the second big data set;
      identify that the result set includes one or more differences;

order the result set by the one or more differences included in a first column of the one or more columns, the one or more differences are included in a top portion of the first column;
select a first predetermined number of rows in the ordered result set;
transpose the first predetermined number of rows in the ordered result set, wherein the columns become rows and the rows become columns;
identify a first set of differences along a first row that corresponds to the first column;
select the first set of differences from the first row;
dynamically reconstruct the SQL query by removing the first column from the SQL query;
execute the reconstructed SQL query;
generate an updated result set;
identify that the result set includes one or more differences;
order the result set by the one or more differences included in a subsequent column of the one or more columns, where the differences are included in a top portion of the subsequent column;
select a subsequent predetermined number of rows in the ordered result set;
transpose the subsequent predetermined number of rows in the ordered result set, wherein the columns become rows and the rows become columns;
identify a second set of differences along one or more subsequent rows that corresponds to the subsequent column; and
select the second set of differences from the one or more subsequent rows; and
amalgamate the first set of differences and the second set of differences into a group of differences; and
a display configured to display group of differences.

19. The system of claim 18, wherein the first predetermined number of rows is 200.

20. The system of claim 18, wherein the first predetermined number of rows and the subsequent predetermined number of rows is 2000.

* * * * *